United States Patent
Suzuki et al.

(10) Patent No.: US 11,731,466 B2
(45) Date of Patent: Aug. 22, 2023

(54) TIRE WEAR DETECTION APPARATUS HAVING A SIGNAL PROCESSOR IN THE TIRE SIDE APPARATUS INCLUDING A STATE DETECTION UNIT AND LEVEL ACQUISITION UNIT AND/OR LEVEL CALCULATON UNIT

(71) Applicant: DENSO CORPORATION, Kariya (JP)

(72) Inventors: Yoichiro Suzuki, Nisshin (JP); Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 294 days.

(21) Appl. No.: 17/236,539

(22) Filed: Apr. 21, 2021

(65) Prior Publication Data

US 2021/0237517 A1 Aug. 5, 2021

Related U.S. Application Data

(63) Continuation of application No. PCT/JP2019/048737, filed on Dec. 12, 2019.

(30) Foreign Application Priority Data

Dec. 14, 2018 (JP) .................... 2018-234597

(51) Int. Cl.
*B60C 11/24* (2006.01)
*B60C 19/00* (2006.01)
*G01M 17/02* (2006.01)

(52) U.S. Cl.
CPC ............ *B60C 11/246* (2013.01); *B60C 19/00* (2013.01); *G01M 17/025* (2013.01); *B60C 2019/004* (2013.01)

(58) Field of Classification Search
None
See application file for complete search history.

(56) References Cited

U.S. PATENT DOCUMENTS 9,050,864 B2 * 6/2015 Singh .................... G01M 17/02
10,471,779 B2 * 11/2019 Masago ................ B60C 11/246
2006/0156790 A1 7/2006 Bocquillon et al.
(Continued)

FOREIGN PATENT DOCUMENTS

| JP | 2009018667 A | 1/2009 |
| WO | WO-2009008502 A1 | 1/2009 |
| WO | WO-2009157516 A1 | 12/2009 |

*Primary Examiner* — Octavia Davis Hollington
*Assistant Examiner* — Jermaine L Jenkins
(74) *Attorney, Agent, or Firm* — Harness, Dickey & Pierce, P.L.C.

(57) ABSTRACT

A tire wear detection apparatus for a vehicle includes a tire side apparatus and a vehicle body side system. In response to a wet road surface being detected, from a vibration waveform of a tire indicated by a detection signal according to a magnitude of a vibration of the tire, the tire side apparatus is configured to (i) acquire a peak level value of a vibration level at a stepping time at which an apparatus corresponding position in the tire corresponding to an arranged position of the tire side apparatus starts to contact the road surface, and/or (ii) calculate a level value of the vibration level in a post-kicking range after the apparatus corresponding position kicks to separate from the road surface, so as to generate a wear data indicating a wear state of the tire.

12 Claims, 11 Drawing Sheets

(56) References Cited

U.S. PATENT DOCUMENTS

2010/0186492 A1 7/2010 Morinaga
2010/0199756 A1 8/2010 Hanatsuka
2011/0118989 A1 5/2011 Morinaga

* cited by examiner

FIG. 13
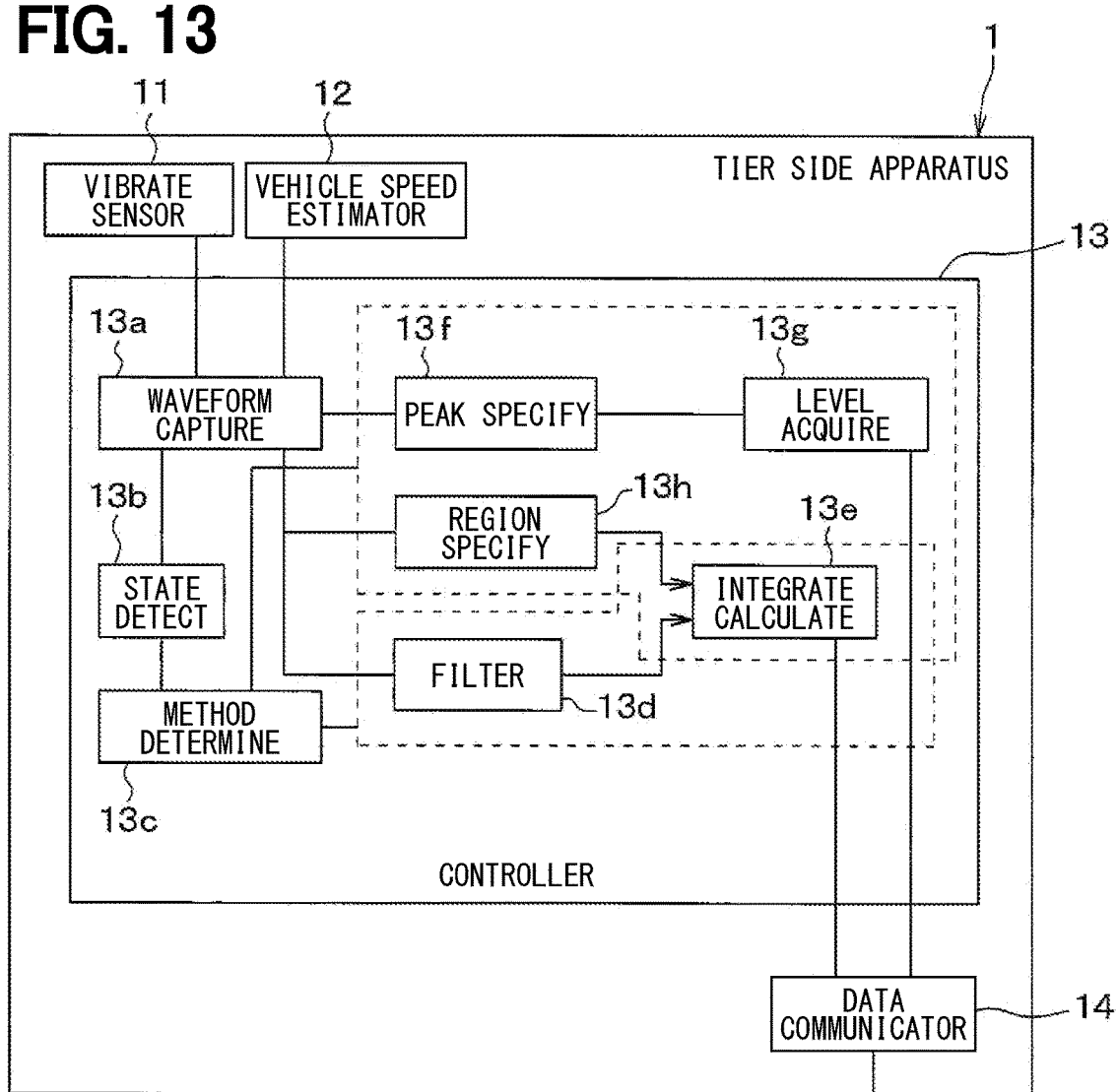
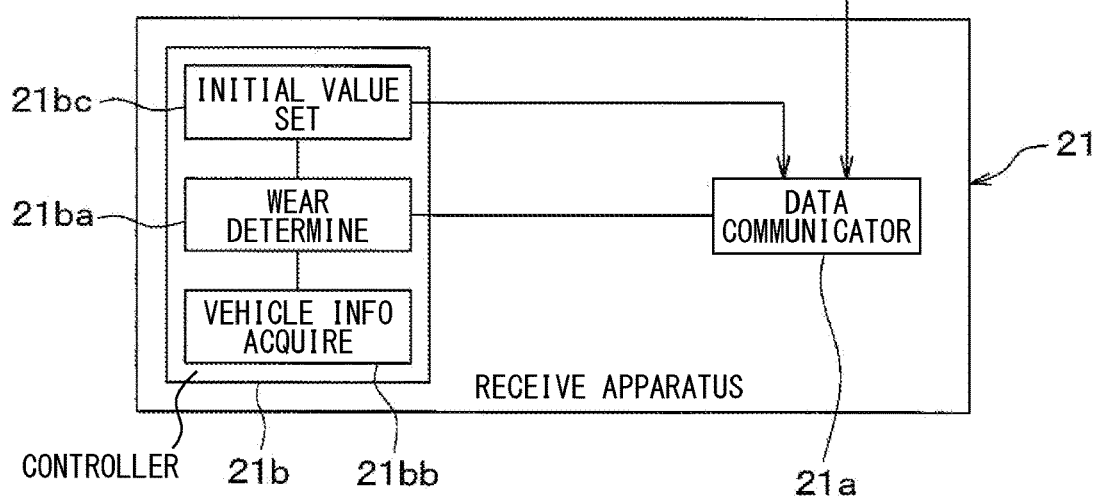

TIRE WEAR DETECTION APPARATUS HAVING A SIGNAL PROCESSOR IN THE TIRE SIDE APPARATUS INCLUDING A STATE DETECTION UNIT AND LEVEL ACQUISITION UNIT AND/OR LEVEL CALCULATON UNIT

CROSS REFERENCE TO RELATED APPLICATIONS

The present application is a continuation application of International Patent Application No. PCT/JP2019/048737 filed on Dec. 12, 2019, which designated the U.S. and claims the benefit of priority from Japanese Patent Application No. 2018-234597 filed on Dec. 14, 2018. The entire disclosures of all of the above applications are incorporated herein by reference.

TECHNICAL FIELD

The present disclosure relates to a tire wear detection apparatus that notifies a tire wear state based on wear data indicating a tire wear state from a tire side apparatus.

BACKGROUND

There is a tire wear detection apparatus for detecting a tire wear state. In this tire wear detection apparatus, the time-series waveform of acceleration is used to extract (i) the acceleration waveform of the stepping-in region, including the peak at the time of stepping, occurring when the rubber block of the tire steps on the road surface, and (ii) the acceleration waveform of the kicking region, including the peak at the time of kicking out (i.e., the kicking time), occurring when the rubber block of the tire moves away to separate from the road surface. Then, the tire wear state is detected from the difference in frequency characteristics obtained by frequency-resolving the respective extracted acceleration waveforms.

SUMMARY

According to an example of the present disclosure, a tire wear detection apparatus for a vehicle is provided to include a tire side apparatus and a vehicle body side system. In response to a wet road surface being detected, from a vibration waveform of a tire indicated by a detection signal according to a magnitude of a vibration of the tire, the tire side apparatus is configured to (i) acquire a peak level value of a vibration level at a stepping time at which an apparatus corresponding position in the tire corresponding to an arranged position of the tire side apparatus starts to contact the road surface, and/or (ii) calculate a level value of the vibration level in a post-kicking range after the apparatus corresponding position kicks to separate from the road surface, so as to generate a wear data indicating a wear state of the tire.

BRIEF DESCRIPTION OF DRAWINGS

The objects, features, and advantages of the present disclosure will become more apparent from the following detailed description made with reference to the accompanying drawings. In the drawings:

FIG. 13 is a diagram showing a block configuration of a tire wear detection apparatus according to a third embodiment.

DETAILED DESCRIPTION

Hereinafter, embodiments of the present disclosure will be described with reference to the drawings. In the following embodiments, the same or equivalent parts are denoted by the same reference signs.

First Embodiment

A tire system 100 including a tire wear state detecting function according to the present embodiment will be described with reference to FIGS. 1 to 11. The tire system 100 according to the present embodiment includes a tire side apparatus 1, and a vehicle body side system 2. Then, the tire system 100 transmits information on tire wear from the tire side apparatus 1 to the vehicle body side system 2, determines the tire wear state by the vehicle body side system 2, and notifies the user. In the present embodiment, the tire system 100 capable of detecting the tire wear state not only on the wet road surface but also on the road surface other than the wet road surface (i.e., non-wet road surface) will be described.

Figure 1:
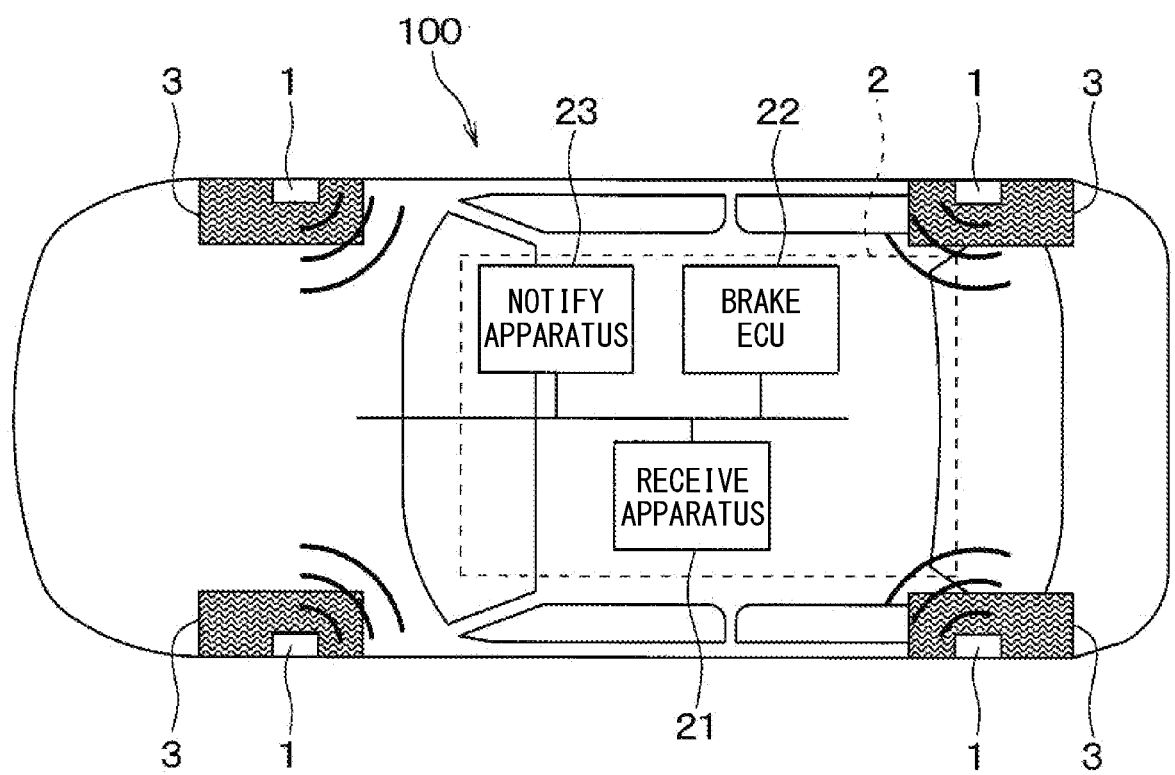
FIG. 1 is a diagram showing a block configuration of a tire wear detection apparatus according to a first embodiment.

As shown in FIG. 1, the tire system 100 is configured to include (i) a tire side apparatus 1 provided on the vehicle wheel side and (ii) a vehicle body side system 2 including various parts provided on the vehicle body side. The vehicle body side system 2 includes a reception apparatus 21, an electronic control unit 22 for brake control (hereinafter referred to as a brake ECU 22), and a notification apparatus 23. The tire system 100 includes a tire wear state detection function that corresponds to the tire wear detection apparatus. In the present embodiment, (i) the tire side apparatus 1 and (ii) the reception apparatus 21 in the vehicle body side system 2 constitute the tire wear detection apparatus. Hereinafter, details of parts constituting the tire side apparatus 1 and the vehicle body side system 2 will be described.

Figure 2:
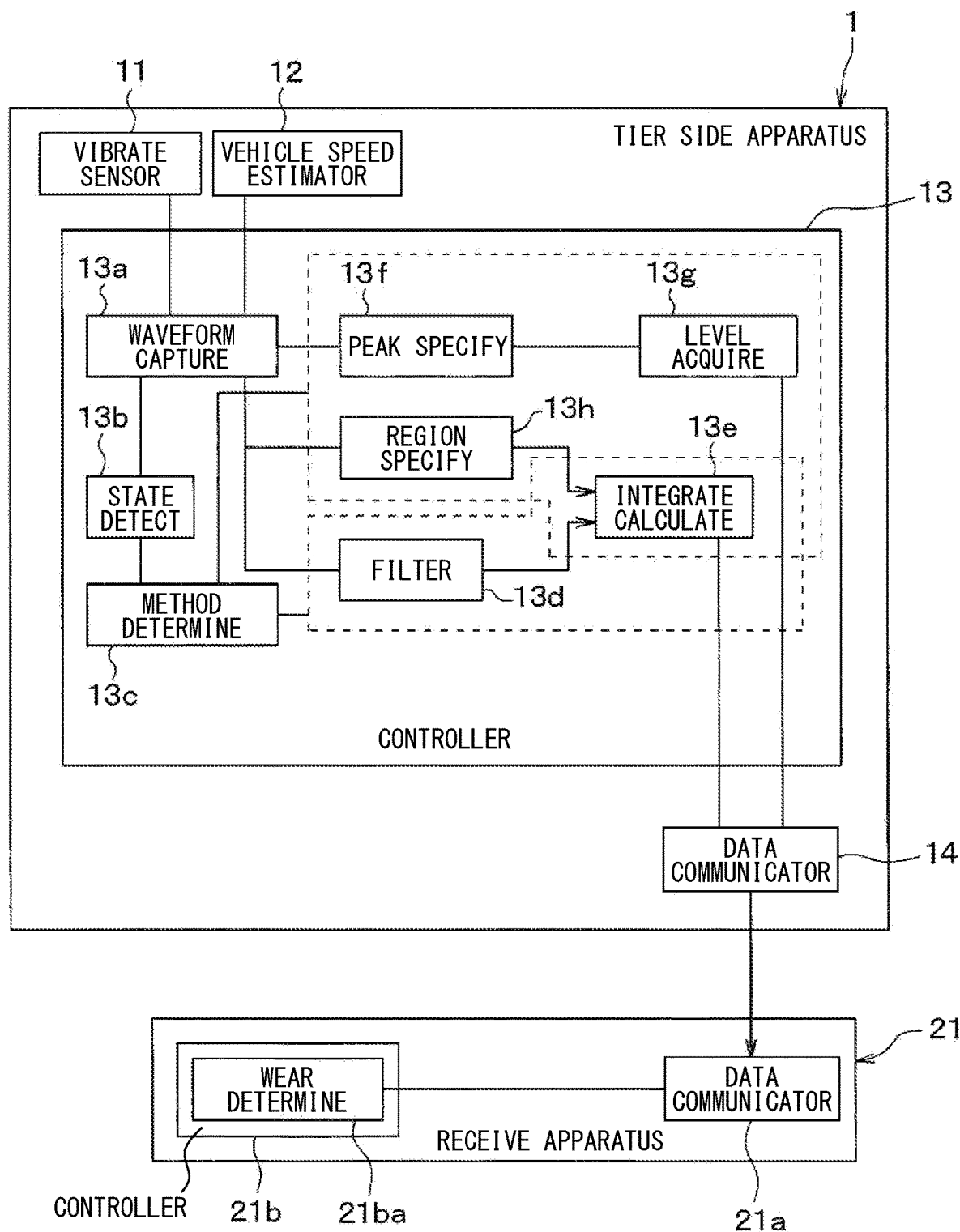
FIG. 2 is a block diagram showing a detailed configuration of a tire side apparatus and a vehicle body side system.
Figure 3:
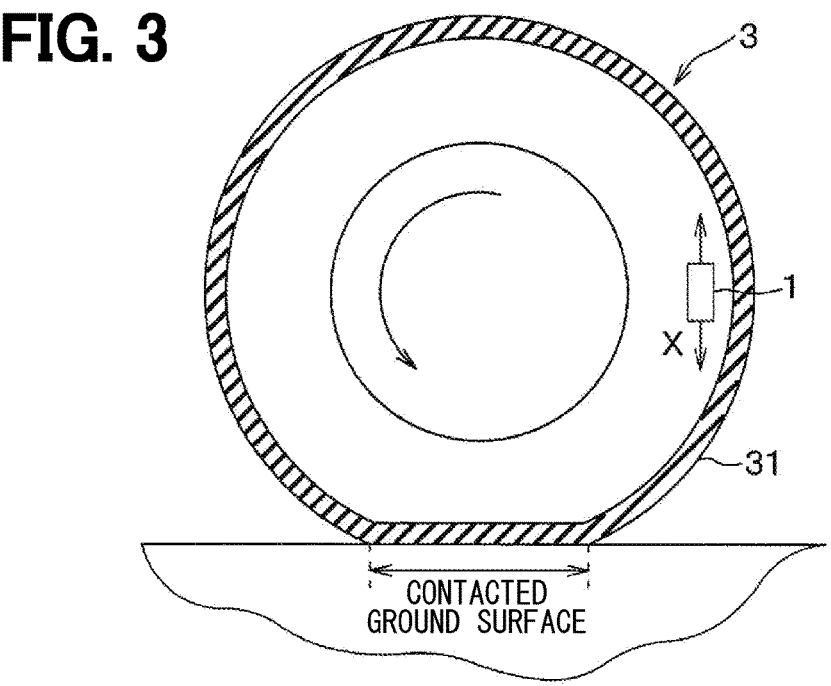
FIG. 3 is a schematic cross-sectional view of a tire to which a tire side apparatus is attached.

First, the tire side apparatus 1 will be described. As shown in FIG. 2, the tire side apparatus 1 includes a vibration sensor device 11, a vehicle speed estimator device 12, a controller unit 13, and a data communicator device 14. For example, as shown in FIG. 3, the tire side apparatus 1 is provided to be arranged on the (inner) back surface side of the tread 31 of the tire 3.

The vibration sensor device 11, which may also be referred to as a vibration sensor 11, is configured as a vibration detector device 11, which may also be referred to as a vibration detector 11, for detecting vibrations applied to the tire. For example, the vibration sensor device 11 is configured by an acceleration sensor 11. In the present embodiment, the vibration sensor device 11 output the detection signal of the acceleration as a detection signal according to the magnitude of vibration in the tangential direction with respect to the circular orbit drawn by the tire side apparatus 1 when the tire 3 rotates, that is, in the tire tangential direction indicated by the arrow X in FIG. 3. More specifically, the vibration sensor device 11 generates as the detection signal an output voltage, which is positive in one direction and negative in the opposite direction, among two directions indicated with the arrow X. For example, the vibration sensor device 11 performs acceleration detection at a predetermined sampling cycle set at a cycle shorter than a period of one rotation of the tire 3, and outputs a detection result as the detection signal. Although the detection signal of the vibration sensor device 11 may be represented as an output voltage or an output current, the detection signal is exemplified to be the output voltage in the present embodiment as an example.

The vehicle speed estimator device 12, which may also be referred to as a vehicle speed estimator 12, estimates the speed (hereinafter, simply referred to as vehicle speed) of a vehicle to which the tire 3 provided with the tire side apparatus 1 is attached. Here, the vehicle speed estimator device 12 estimates (i.e., calculate) the vehicle speed based on the detection signal of the vibration sensor device 11. Note that the vehicle speed estimator device 12 may also be referred to as a vehicle speed calculator device 12 or a vehicle speed calculator 12. Further, as an example of the present embodiment, the vehicle speed estimator device 12 may be configured by one or more hardware circuits. Furthermore, part or all of the vehicle speed estimator device 12 may be configured to be included in the controller unit 13.

Figure 4:
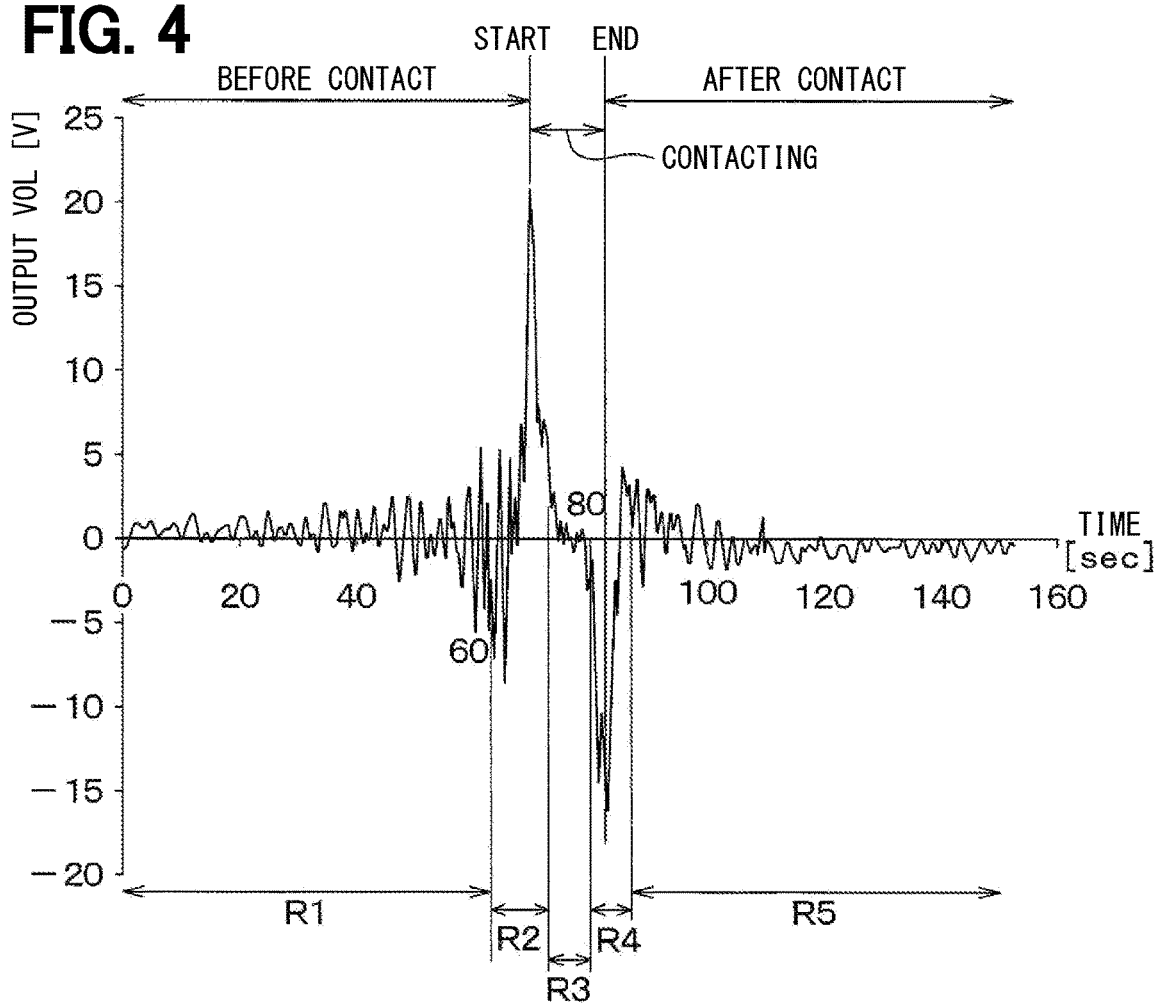
FIG. 4 is an output voltage waveform diagram of a vibration sensor device during tire rotation.

For example, the output voltage waveform of the detection signal of the vibration sensor device 11 during tire rotation is as shown in FIG. 4. The position in the tread 31 of the tire 3 corresponding to or opposing the position of the tire side apparatus 1, which is arranged in the back surface side of the tire tread 31, may be hereinafter referred to as an apparatus corresponding position (which may also be referred to as an apparatus corresponding tread position or an apparatus arrangement tread position). As shown in FIG. 4, the output voltage of the vibration sensor device 11 takes a local maximum value at a stepping time, which may also be referred to as a contact start time, at which the apparatus corresponding position starts to contact (i.e., touch) the ground (i.e., road surface) or starts to step on the ground during rotation of the tire 3. Hereinafter, a peak value at the contact start time of contacting the ground where the output voltage of the vibration sensor device 11 takes the local maximum value is referred to as a first peak value. Further, as shown in FIG. 4, the output voltage of the vibration sensor device 11 takes a local minimum value at the contact end time of ending contacting the ground (i.e., road surface) when the apparatus corresponding position in the tread separates from the ground. Hereinafter, a peak value at the contact end time of ending contacting the ground where the output voltage of the vibration sensor device 11 takes the local minimum value is referred to as a second peak value.

The output voltage of the vibration sensor device 11 takes the peak values at the above-described times for the following reasons. When the apparatus corresponding position comes to contact the ground during rotation of the tire 3, the portion of the tire 3 having been in generally cylindrical shape is pressed and deformed in a planar shape near the vibration sensor device 11. With reception of an impact at this time (i.e., at the start of contacting the ground), the output voltage of the vibration sensor device 11 takes the first peak value. When the apparatus corresponding position comes to leave the contacted ground surface during rotation of the tire 3, the portion of the tire 3 adjacent to the vibration sensor device 11 is released from the pressure and returned from the planar shape to the generally cylindrical shape. With reception of an impact at the time of returning to the original shape of the tire 3, the output voltage of the vibration sensor device 11 takes the second peak value. As described above, the output voltage of the vibration sensor device 11 takes the first peak value and the second peak value at the ground contact start time and the ground contact end time, respectively. Since a direction of the impact at the time when the tire 3 is pressed and a direction of the impact at the time when the tire 3 is released from the pressure are opposite, polarities or signs of the output voltage are also opposite.

Here, the moment when the apparatus corresponding position in the tire tread 31 contacts the road surface is referred to as a "stepping region" or "contact start region", and the moment when the apparatus corresponding position is separated from the road surface is referred to as a "kicking region" or "contact end region". The stepping region includes the time point of the first peak value, and the kicking region includes the time point of the second peak value. Note that, the region before the stepping region is referred to as a "pre-stepping region" or "pre-contacting region". The region between the stepping region and the kicking region (i.e., the region where the apparatus corresponding position is being contacting the ground is referred to as a "pre-kicking region" or "contacting region". The region after the kicking region is referred to as a "post-kicking region" or "region following the contact end time". In this way, the period in which the apparatus corresponding position is grounded and before and after the period can be divided into five time zones or regions. In FIG. 4, the pre-stepping region R1, the stepping region R2, the pre-kicking region R3, the kicking region R4, and the post-kicking region R5 of the detection signal are indicated as five time regions R1 to R5 in sequence, respectively.

In this way, when the tire 3 makes one rotation, the detection signal of the vibration sensor device 11 shows the vibration waveform shown in FIG. 4. Therefore, for example, each of (i) the time interval between the neighboring first peak values and (ii) the time interval between the neighboring second peak values is the time required for the tire 3 to make one rotation. Therefore, the vehicle speed estimator device 12 estimates or calculates the vehicle speed from the time required for the tire 3 to make one rotation and the length of one round of the tire 3.

The controller unit 13, which may also be referred to as a controller 13, is a part corresponding to a signal processor that creates data related to a detection target. The controller unit 13 is composed of a microcomputer equipped with a CPU, ROM, RAM, I/O, etc., and performs various types of processing according to a program stored in the ROM or the like. For example, the controller unit 13 uses the detection signal of the vibration sensor device 11 as a detection signal representing vibration data in the tire tangential direction, and processes this signal to obtain data on the tire wear state (hereinafter referred to as wear data). Then, the process of transmitting it to the data communicator device 14 is performed.

Here, the controller unit 13 differentiates, from each other, (i) a wet road surface and (ii) a road surface other than the wet road surface (i.e., non-wet road surface), for example, a dry road surface by detecting the road surface state. The controller unit 13 prepares the wear data by performing different signal processing for each of the wet road surface and the non-wet road surface. Specifically, the controller unit 13 obtains the vibration level of the tire 3 by performing waveform processing of the vibration waveform indicated by the detection signal of the vibration sensor device 11. Then, in the case of a wet road surface, the controller unit 13 obtains the peak level value of the vibration level at the stepping time, or obtains the integrated value of the vibration level in the post-kicking region. Further, in the case of a non-wet road surface that is a road surface state other than the wet road surface, the controller unit 13 calculates the level value of the vibration level in a predetermined frequency band of the detection signal of the vibration sensor device 11. The level value in this case may be a level value of an optional frequency, but here, the controller unit 13 obtains an integral value of the level value in a predetermined frequency band. More specifically, the controller unit 13 includes functional units for acquiring vibration data, such as a waveform capture unit 13a, a state detection unit 13b, a method determination unit 13c, a filter unit 13d, an integration calculation unit 13e, and a peak specification unit 13f, a level acquisition unit 13g, and a region specification unit 13h.

The waveform capture unit 13a is a portion that acquires the detection signal of the vibration sensor device 11. Here, the waveform capture unit 13a sets one rotation of the tire 3 as a capturing range, and captures the waveform for one rotation of the tire 3 from the detection signal of the vibration sensor device 11. Specifically, the waveform capture unit 13a calculates the time required for the tire 3 to make one rotation based on the vehicle speed detection result of the vehicle speed estimator device 12, and captures the detection signal of the vibration sensor device 11 for that time required for the tire 3 to make one rotation.

The state detection unit 13b detects the road surface state. The vibration waveform of the tire 3 indicated by the detection signal of the vibration sensor device 11 captured by the waveform capture unit 13a corresponds to the road surface state. Therefore, by extracting the characteristics of the vibration waveform, it is detected whether the road surface is wet or the road surface is other than that. For example, on a wet road surface, the vibration before stepping on becomes large. Therefore, the state detection unit 13b compares the vibration level value indicating the magnitude of vibration before stepping on, or the average value or integrated value thereof with a predetermined threshold value. If it is larger than the threshold value, it is determined as a wet road surface, and if it is smaller than the threshold value, it is determined as a non-wet road surface.

The method determination unit 13c determines a signal processing method according to the road surface state. As described above, the state detection unit 13b detects that the road surface is wet or the road surface is other than that. Therefore, the method determination unit 13c selects a normal signal processing method when the road surface is other than the wet road surface, and selects a signal processing method for the wet road surface when the road surface is wet. When a normal signal processing method is selected, signal processing is performed using the filter unit 13d and the integration calculation unit 13e. When the signal processing method for the wet road surface is selected, the signal processing is performed by using the peak specification unit 13f, the level acquisition unit 13g, the region specification unit 13h, and the integration calculation unit 13e.

The filter unit 13d extracts a vibration component of a specific frequency band by filtering a predetermined frequency band from the detection signal of the vibration sensor device 11 for one rotation of the tire 3 captured by the waveform capture unit 13a. Here, the filter unit 13d, which may also be referred to as a filter device 13d or a filter 13d, is composed of a high-pass filter; by passing the filter unit 13d, for example, a frequency band of 1.5 kHz or more is extracted from the detection signal of the vibration sensor device 11.

The frequency characteristics of the vibration level in the stepping region and the kicking region of the tire 3 are determined based on the vibration characteristics of the tire 3 including the rubber block; the vibration level has a peak at the natural vibration frequency of the tire 3 including the rubber block. Then, in a frequency band higher than the natural vibration frequency, the vibration level is attenuated due to the vibration isolation effect of the rubber block. The natural vibration frequency of the tire 3 including the rubber block changes according to the wear state of the rubber block, and increases as the wear of the rubber block progresses.

Figure 5:
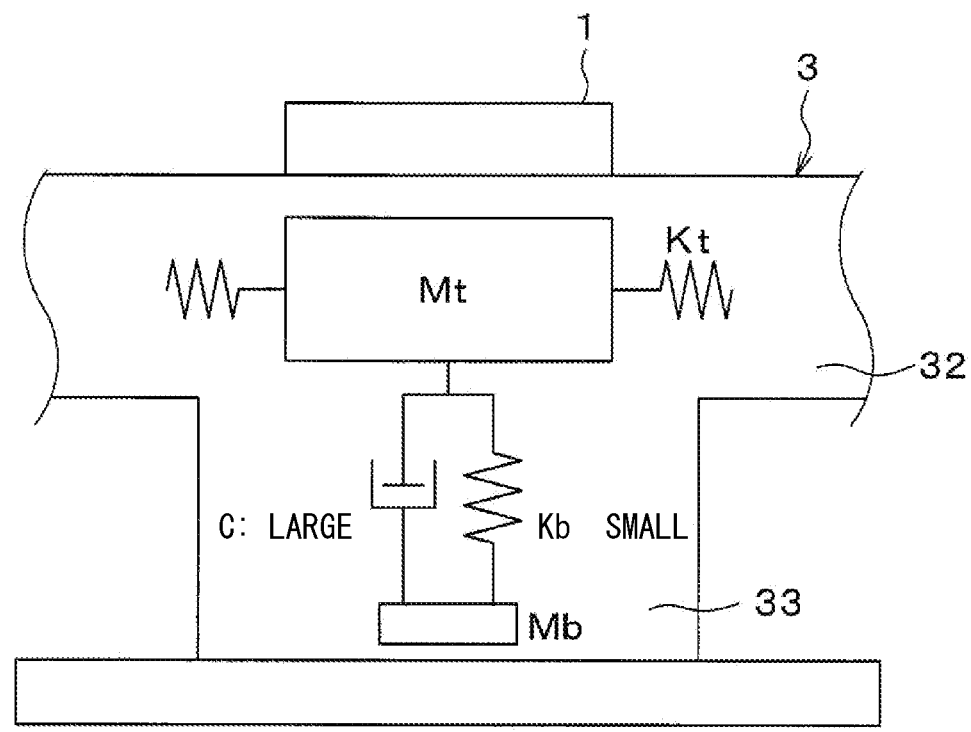
FIG. 5 is a diagram showing a vibration model of a tire.

This will be described with reference to the drawings. FIG. 5 shows a vibration model of the tire 3. Of the tread surface 32 and the rubber block 33 of the tire 3, (i) the mass of the portion that affects the vibration applied to the tire side apparatus 1 is described as Mt, (ii) the spring constant is described as Kt, (iii) the mass of the rubber block 33 is described as Mb, (iv) the spring constant is described as Kb, and (v) the damper damping coefficient is described as C. In the tire 3, the rubber block 33 serves as a low-pass filter by acting as a vibration-proof material against input vibration from the road surface.

When the tire 3 is new, the groove of the tire tread 31 is deep and the height of the rubber block 33 is high. As the tire wear progresses, the groove of the tire tread 31 becomes shallow and the height of the rubber block 33 becomes low. Therefore, as compared with the case where the tire 3 is new, when the tire wear progresses, the mass Mb of the rubber block 33 becomes smaller and the spring constant Kb becomes larger. Then, the function of the rubber block 33 as a low-pass filter is reduced, and the high-frequency component of the tire vibration is increased.

Figure 6:
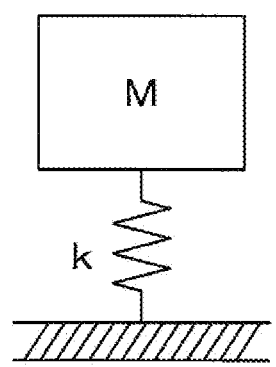
FIG. 6 is a diagram of a typical vibration model.

Here, a general vibration model is represented as shown in FIG. 6, and the natural vibration frequency Fn in this vibration model is represented by the following expression. In Expression 1, k is the spring constant of the vibration isolator in the vibration model, and m is the mass of the vibration source.

$$Fn = \frac{1}{2\pi}\sqrt{\frac{k}{m}} \qquad \text{[Expression 1]}$$

In the present embodiment, the vibration target that constitutes the vibration model is the rubber block 33. The spring constant k is defined as a value obtained by multiplying the Young's modulus determined by the material of the rubber block 33 by the area of the vibration target and dividing by the thickness (i.e., the height) of the vibration target.

In the vibration model of the tire 3 shown in FIG. 5, the mass Mt is sufficiently larger than the mass Mb, and the spring constant Kt is sufficiently larger than the spring constant Kb. Therefore, it can be regarded as a general vibration model shown in FIG. 6 in consideration of only the mass Mt and the spring constant Kb. That is, the mass m and the spring constant k in Expression 1 can be replaced with the mass Mt and the spring constant Kb in FIG. 5, respectively. When the rubber block 33 is worn and the height is lowered, the mass Mb is reduced and the spring constant Kb is increased accordingly. In this case, the mass Mt does not change so much, and assuming that the spring constant Kb becomes large, the natural vibration frequency Fn shown by Expression 1 increases.

Figure 7:
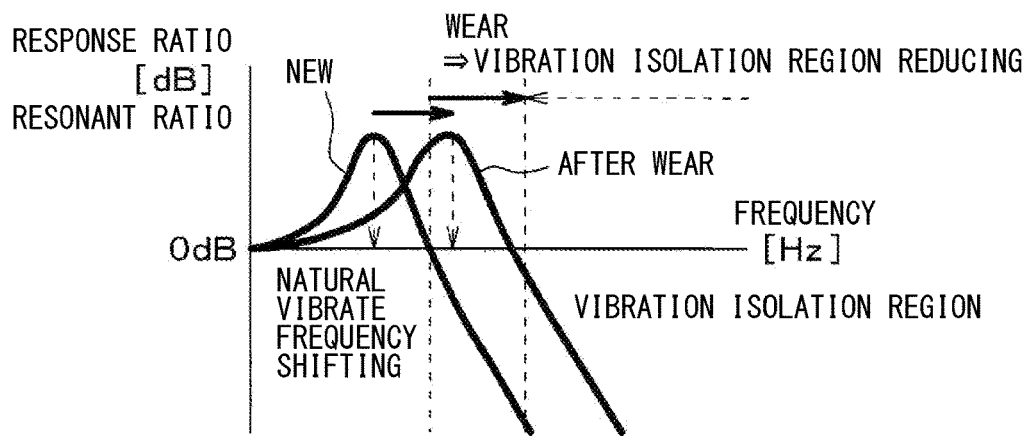
FIG. 7 is a diagram showing the results of investigating the frequency characteristics of the vibration level of the tire for each of a new tire and a worn tire.

As described above, the frequency characteristics of the vibration level in the stepping region and the kicking region of the tire 3 are determined based on the vibration characteristic of the tire 3 including the rubber block 33. The vibration level has a peak at the natural vibration frequency Fn of the tire 3 including the rubber block 33. Then, the natural vibration frequency Fn increases as the rubber block 33 wears and the height becomes lower. For example, as shown in FIG. 7, when the tire 3 is new and the groove depth is 8 mm, the natural vibration frequency Fn is 1.0 kHz; when the tire 3 is worn and the groove depth is 1.6 mm, the natural vibration frequency Fn is 1.5 kHz. The natural vibration frequency Fn has a different value depending on the material of the tire 3 and the like, but regardless of the material of the tire 3, the natural vibration frequency Fn increases as the tire 3 wears.

Note that, the groove depth that serves as a guideline for replacing the tire 3 is determined; the natural vibration frequency Fn when the groove depth of the tire 3 becomes the determined guideline for replacement is set as a specific frequency. A frequency band above the specific frequency is therefore set as a specific frequency band and can be extracted by the filter unit 13d. For example, suppose the case where the recommended groove depth for replacing the tire 3 is 3.0 mm, and that depth is used as the groove depth as a guideline for replacing the tire 3. In this case, the filter unit 13d may extract components in a high frequency band of, for example, 1.5 kHz or more.

The integration calculation unit 13e generates wear data corresponding to the vibration level for a specific part of the vibration waveform of the detection signal input from the filter unit 13d or the region specification unit 13h. The integration calculation unit 13e may also be referred to as a level calculation unit 13e. In the present embodiment, the integration calculation unit 13e calculates the integrated value of the level value of the vibration level, and uses the integrated value as wear data.

Specifically, when the normal signal processing method is selected, the integration calculation unit 13e calculates the integrated value of the level value of the vibration level in the specific frequency band extracted by the filter unit 13d. Further, when the signal processing method for the wet road surface is selected, the integration calculation unit 13e calculates the integrated value of the vibration level in the post-kicking region specified by the region specification unit 13h, as will be described later. The calculation of the level value here may be performed from the detection signal for one rotation of the tire 3. However, it may be calculated as an integrated value of detection signals for a plurality of rotations of the tire 3. The integrated value may be calculated as an average value divided by the number of revolutions of the tire 3.

As shown in FIG. 7 described above, the natural vibration frequency Fn increases with the wear of the tire 3. Then, when viewed at the same frequency, the vibration level of the detection signal of the vibration sensor device 11 increases as the wear of the tire 3 increases. Therefore, a difference occurs in the level value of the vibration level in the specific frequency band depending on the wear state of the tire 3, and a difference also occurs in the integrated value thereof.

Figure 8:
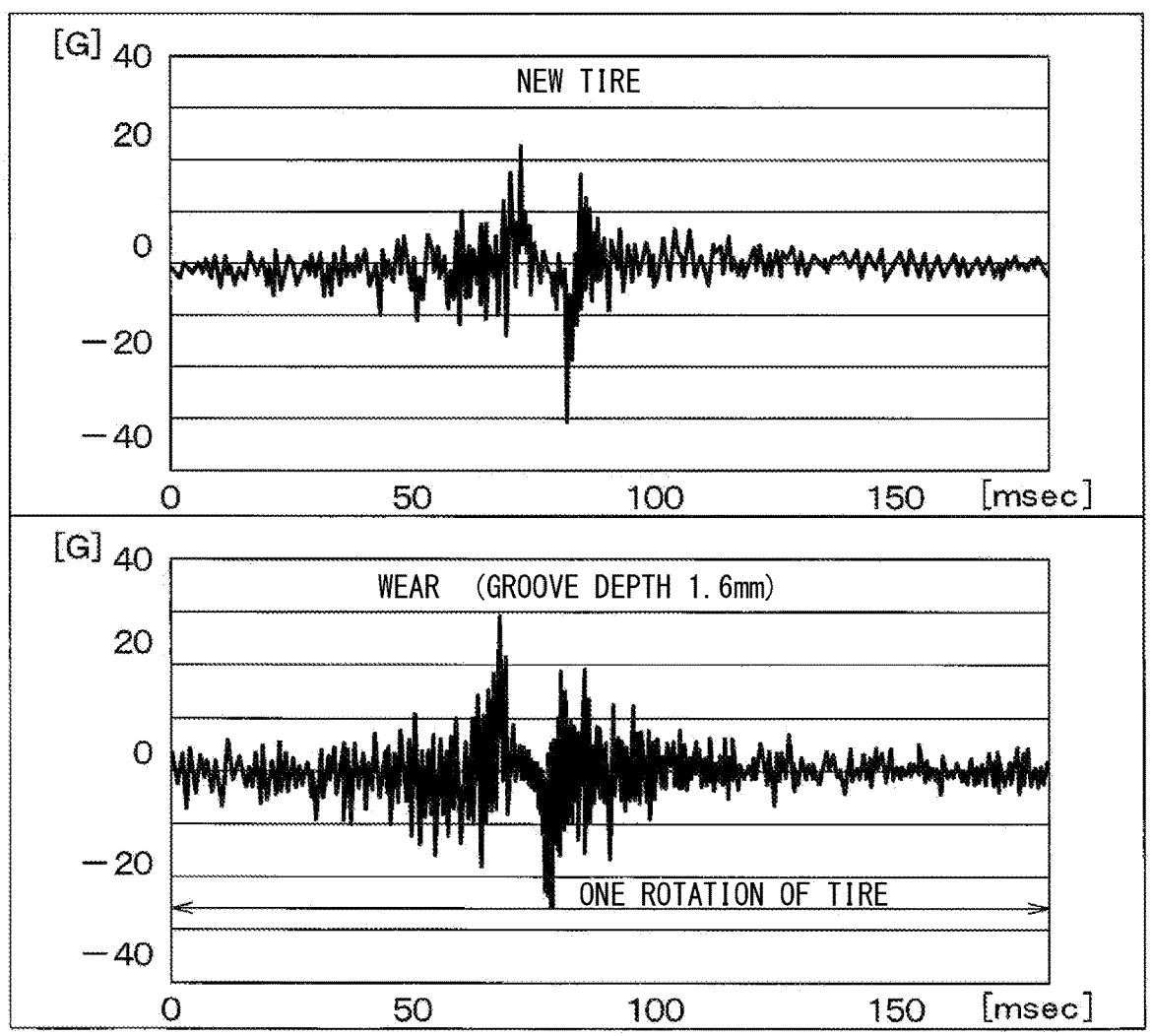
FIG. 8 is a comparative diagram showing output voltage waveforms of a vibration sensor device during tire rotation for each of a new tire and a worn tire.
Figure 9:
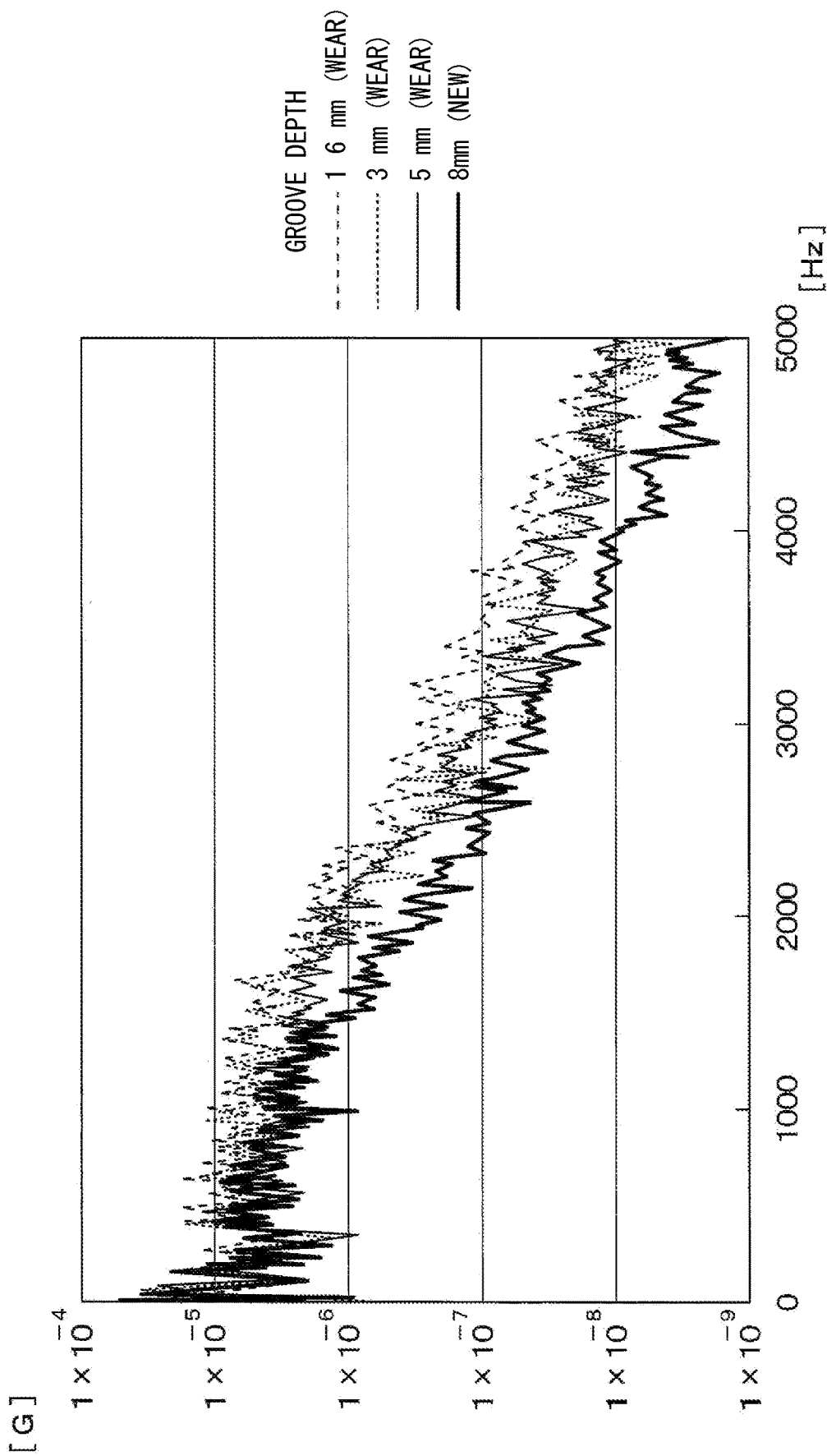
FIG. 9 is a diagram showing a frequency characteristic of a vibration spectrum when the groove depth of a tire changes due to wear.

As a reference, it was investigated how the detection signal and the vibration level of the vibration sensor device 11 change according to the wear state of the tire 3. In addition, in order to eliminate the influence of vibration due to the unevenness of the road surface, the measurement result is taken when traveling on a flat road surface. FIG. 8 shows the detection signals of the vibration sensor device 11 (i) when the tire 3 is new and the groove depth is 8 mm, and (ii) when the wear progresses and the groove depth becomes 1.6 mm. FIG. 9 shows the frequency characteristics of the vibration spectrum (i.e., the acceleration spectrum in the present embodiment) when the groove depths of the tire 3 are 8 mm, 5 mm, 3 mm, and 1.6 mm. FIG. 9 shows the frequency characteristics of the vibration spectrum for one rotation of the tire 3. Note that to obtain the vibration spectrum for one rotation, the vibration spectrums for 10 rotations of the tire 3 are acquired, and the average value thereof is obtained.

As shown in FIG. 8, when the tire 3 is new and not worn and has a sufficient groove depth, the vibration of the detection signal of the vibration sensor device 11 is small. However, when the tire 3 is worn and the groove depth is small, the vibration of the detection signal of the vibration sensor device 11 becomes large. Also, as shown in FIG. 9, it can be seen that the vibration spectrum of the detection signal of the vibration sensor device 11 becomes larger as the wear state of the tire 3 progresses in the frequency band above the natural vibration frequency Fn. From this, it can be seen that the wear state of the tire 3 can be detected by examining the level value of the vibration level in the specific frequency band above the natural vibration frequency Fn, for example, the integrated value thereof.

Figure 10:
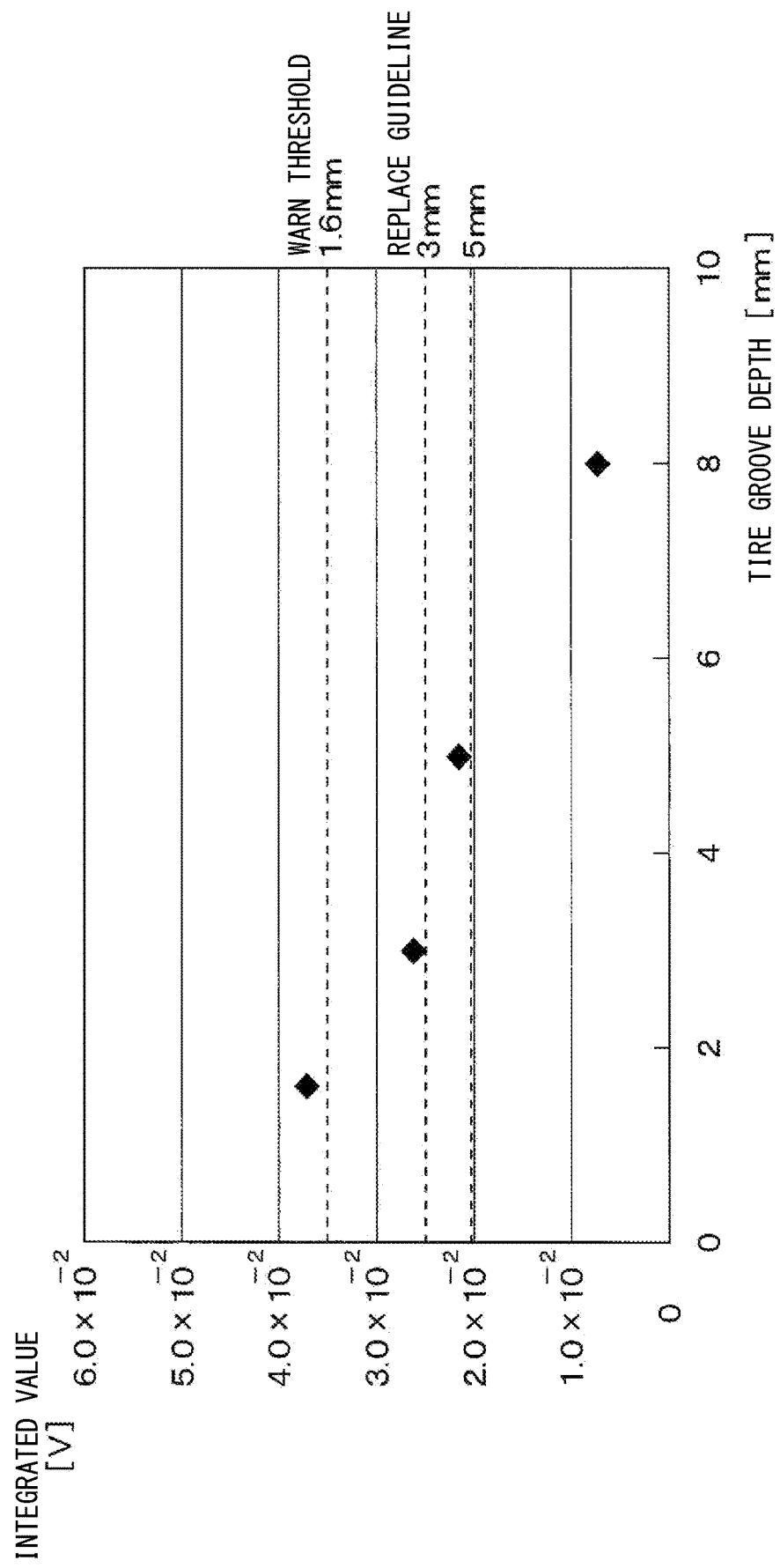
FIG. 10 is a diagram showing the results of investigating the relationship between the groove depth and the integrated value of the vibration level in a specific frequency band by changing the type of tire.

In addition, the relationship between the groove depth and the integrated value of the vibration level in a specific frequency band was investigated. FIG. 10 is a diagram showing the results. The integrated value of the vibration level of the detection signal of the vibration sensor device 11 is calculated in the frequency band of 1.5 Hz or more. The integrated values are calculated for 10 rotations of the tire 3, and the median value of the integrated values obtained for each frequency is shown in a plot.

As shown in FIG. 10, the smaller the groove depth, that is, the more the tire 3 is worn, the larger the integrated value becomes. Therefore, it is possible to detect the wear state of the tire 3 by examining the level value of the vibration level in a specific frequency band equal to or higher than the natural vibration frequency Fn, for example, the integrated value thereof. Then, for example, suppose a case where the threshold value is set to 0.02 [V]. In this case, when it is determined that the groove depth of the tire 3 has reached 5 mm, it can be notified from the notification apparatus 23. Suppose a case where the threshold value is set to 0.025 [V].

In this case, when it is determined that the groove depth of the tire 3 has reached 3 mm, it can be notified from the notification apparatus 23. Further, suppose a case where a warning threshold value is set in addition to the threshold value as a guideline for replacement of the tire 3, for example, the warning threshold value is set to 0.035 [V]. In this case, when it is determined that the groove depth of the tire 3 has reached 1.6 mm, the notification apparatus 23 can warn that the tire 3 needs to be replaced immediately. Here, the relationship between the groove depth and the integrated value of the vibration level in a specific frequency band is shown for one type of tire 3. When a plurality of types of tires 3 were investigated, the same relationship was found even if the types of tires 3 were changed, although the integrated values were different.

Figure 11:
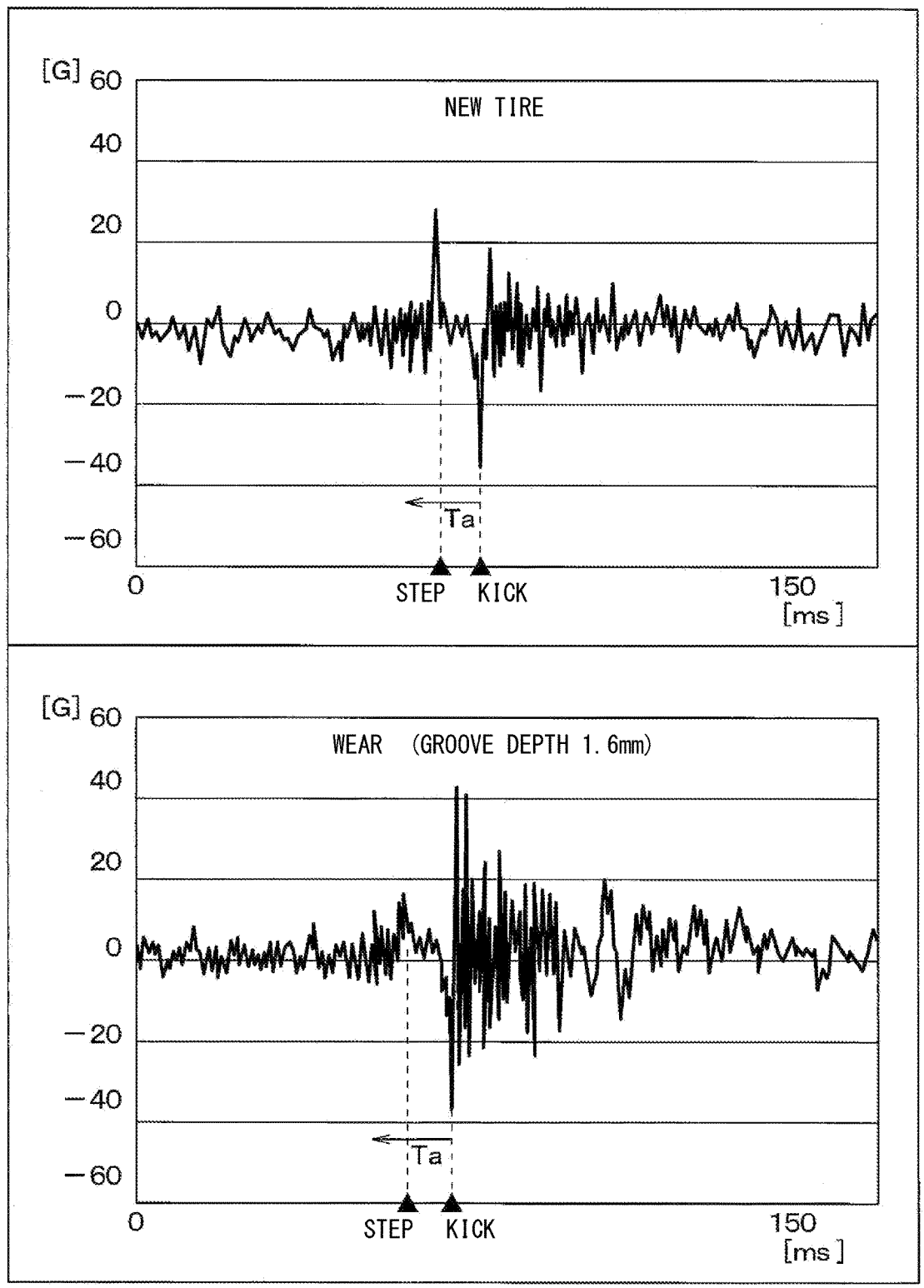
FIG. 11 is a diagram showing changes in detection signals of the vibration sensor device before and after tire wear on a wet road surface.

The peak specification unit 13$f$ specifies the peak of the vibration level at the stepping time from the vibration waveform of the detection signal for one rotation of the tire 3 captured by the waveform capture unit 13$a$. As shown in FIG. 11, it was investigated how the detection signal of the vibration sensor device 11 changes before and after the wear of the tire 3 on a wet road surface. In this case, it was confirmed that there was a difference between the peak value of the vibration level at the stepping time and the magnitude of the vibration level in the post-kicking region. The peak specification unit 13$f$ specifies the timing of the peak in order to obtain the peak value of the vibration level at the stepping time. For example, the detection signal of the vibration sensor device 11 has the vibration waveform shown in FIG. 4. Therefore, as shown in FIG. 11, the peak specification unit 13$f$ sets or defines as a reference time point, the time point at which the vibration level becomes the minimum value at the kicking time, which may also be referred to as a contact end time, at which the apparatus corresponding position kicks to separate from the road surface. The peak specification unit 13$f$ then sets or defines a duration (Ta), the duration starting with a time point tracing back a predetermined period of time from the reference time point, the duration ending with the reference time point. Further, the peak specification unit 13$f$ sets or defines, as the time point of the peak of the vibration level, a time point at which the vibration level becomes a maximum value during the duration (Ta). This time point at which the vibration level becomes a maximum value during the duration (Ta) is the time point at which the vibration level peaks at the stepping time.

The level acquisition unit 13$g$ acquires a peak level value which is a level value at the time point at which the vibration level has a peak at the stepping time specified by the peak specification unit 13$f$. For example, the peak level value is acquired by reading the level value at the time point at which the vibration level has a peak at the stepping time specified by the peak specification unit 13$f$.

The region specification unit 13$h$ specifies the post-kicking region from the vibration waveform of the detection signal for one rotation of the tire 3 captured by the waveform capture unit 13$a$. As described above, on the wet road surface, it was confirmed that there be a difference in the magnitude of the vibration level in the post-kick region between before and after the tire 3 is worn. The region specification unit 13$h$ specifies the post-kicking region in order to obtain the vibration level of the detection signal of the vibration sensor device 11 in the post-kicking region.

As described above, the post-kicking region is specified by the region specification unit 13$h$. Then, in the integration calculation unit 13$e$, the integrated value of the level value of the vibration level is calculated for the post-kicking region of the detection signal of the vibration sensor device 11, and this is used as wear data.

Further, the controller unit 13 controls (i) the acquisition timing of wear data and (ii) the data transmission from the data communicator device 14. Specifically, the controller unit 13 causes various functional units provided in the controller unit 13 to function at a timing when it is desired to detect the wear state of the tire 3. The controller unit 13 transmits the wear data corresponding to the vibration level of the detection signal of the vibration sensor device 11 to the data communicator device 14. At this time, the controller unit 13 also includes data related to the processing method so that the wear data can be determined whether the wear data has been processed by the signal processing method for wet road surface or by the normal signal processing method.

Although it depends on the type of the tire 3, the vehicle type of the vehicle, and/or the traveling method, it is generally said that the tire 3 wears about 1 mm for every 5000 km of traveling. Therefore, here, the controller unit 13 calculates the mileage of the vehicle from the rotation speed of the tire 3 and detects the wear state of the tire 3 every time the vehicle travels one to several hundred kilometers.

Of course, the wear state of the tire 3 may be detected at each time when it is detected that the vehicle has traveled based on the detection signal of the vibration sensor device 11. Alternatively, a timer may be provided in the controller unit 13 so that the wear state of the tire 3 can be detected at predetermined intervals measured by the timer.

The data communicator device 14, which may also be referred to as a data communicator 14 or a data communication transceiver 14, is a part corresponding to a first data communicator device that communicates with the vehicle body side system 2. For example, when the wear data is transmitted from the controller unit 13 to the data communicator device 14, the data communicator device 14 transmits the received wear data at that time. The time of data transmission from the data communicator device 14 is controlled by the controller unit 13. For example, in the case of wear data, each time the wear data is transmitted from the controller unit 13 to the data communicator device 14 in response to the vehicle traveling a predetermined distance, the data communicator device 14 transmits the received wear data.

The tire side apparatus 1 is provided with a power supply device (not shown); the devices or the like included in the tire side apparatus 1 operate based on the power supply from the power supply device. The power supply device may be composed of a battery such as a button battery.

The following will describe the vehicle body side system 2. As described above, the vehicle body side system 2 includes a reception apparatus 21, a brake ECU 22, and a notification apparatus 23.

The reception apparatus 21 receives the wear data transmitted from the tire side apparatus 1 and detects the wear state of the tire 3. Specifically, the reception apparatus 21 is configured to include a data communicator device 21$a$ and a controller unit 21$b$.

The data communicator device 21$a$, which may also be referred to as a data communicator 21$a$ or a data communication transceiver 21$a$, is provided as a second data communicator device. The data communicator device 21$a$ plays a role of receiving the wear data transmitted from the data communicator device 14 of the tire side apparatus 1 and transmitting it to the controller unit 21$b$.

The controller unit 21$b$, which may also be referred to as a controller 21$b$, is composed of a well-known microcomputer including a CPU, ROM, RAM, I/O, etc., and performs various processes according to a program stored in the ROM or the like. The controller unit 21b is provided with a wear determination unit 21ba. The tire wear determination unit 21ba detects the tire wear by performing various processes related to determination of the tire wear state based on the wear data. In the present embodiment, different wear data are used for each of (i) a non-wet road surface such as a dry road surface and (ii) a wet road surface. Therefore, the wear determination unit 21ba determines whether the wear data is in a non-wet road surface or in a wet road surface, based on the data related to the processing methods of the signal processing included in the wear data. The wear determination unit 21ba thereby detects the tire wear state corresponding to the respective methods.

First, in the case of a non-wet road surface that is not a wet road surface such as a dry road surface, the integrated value of the level value in a predetermined frequency band is used as wear data. Therefore, the wear determination unit 21ba determines the tire wear state based on the integrated value in the predetermined frequency band. For example, the wear determination unit 21ba determines the tire wear state by comparing the integrated value with a threshold value obtained by an experiment or the like. For example, the threshold value can be an integrated value corresponding to the groove depth as a guideline for replacing the tire 3. As the wear of the tire 3 progresses, the groove depth of the tire 3 becomes a groove depth as a guideline for replacement. The threshold value is set as the integrated value that is assumed to be calculated by the integration calculation unit 13e at the time of becoming the guideline for replacement based on the detection signal of the vibration sensor device 11. Therefore, when the integrated value indicated by the wear data exceeds the threshold value, the wear determination unit 21ba detects that the tire has reached the tire wear state in which the groove depth of the tire 3 is assumed to have reached the groove depth which is a guideline for replacing the tire 3.

Further, it is shown that the larger the integrated value is, the more the tire 3 is worn. Therefore, the wear determination unit 21ba can determine the wear state of the tire 3, in other words, the groove depth of the tire 3, according to the magnitude of the integrated value.

On the other hand, on a wet road surface, (i) the integrated value of the peak level value of the vibration level at the stepping time of stepping on and (ii) the level value of the vibration level in the post-kicking region are used as wear data. Therefore, the wear determination unit 21ba detects the tire wear state based on these wear data. For example, the wear determination unit 21ba determines the tire wear state by comparing the integrated value and the peak level value with the corresponding threshold values obtained by experiments and the like. For example, the threshold value can be an integrated value or a peak level value corresponding to the groove depth as a guideline for replacing the tire 3. That is, when the tire 3 is worn and the groove depth of the tire 3 reaches the groove depth as a guideline for replacement, it is assumed that, based on the detection signal of the vibration sensor device 11, the integrated value is calculated by the integration calculation unit 13e and the peak level value is acquired by the level acquisition unit 13g. Such the calculated integrated value and the acquired peak level value are set as the respective threshold values. Therefore, when both the integrated value and peak level value indicated by the wear data exceed the respective threshold values, the wear determination unit 21ba detect the arrival of the tire wear state where the groove depth of the tire 3 is assumed to have arrived at the groove depth as a guideline for replacing the tire 3.

Also in this case, the larger the integrated value and the peak level value are, the more the tire 3 is worn. Therefore, the wear determination unit 21ba can determine the wear state of the tire 3, in other words, the groove depth of the tire 3, according to the magnitude of the integrated value.

In the above, the tire wear state is detected using both the peak level value of the vibration level at the stepping time and the integrated value of the level value of the vibration level in the post-kicking region. However, it is possible to detect the tire wear state by using data indicating at least one of them as wear data. Further, in the above, the wear determination unit 21ba determines the tire wear state based on the integrated value. However, the tire wear state can be determined based on, for example, the level value of an optional frequency by using the level value of the vibration level of the tire 3 in a specific frequency band, not limited to the integrated value.

Further, the wear determination unit 21ba transmits the detection result of the tire wear state to the notification apparatus 23 as necessary, and the notification apparatus 23 notifies the driver of the tire wear state. As a result, the driver will try to drive in response to the tire wear state until the tire 3 is replaced. It is thus possible to avoid the danger of the vehicle and to appropriately replace the worn tire 3.

Further, the wear determination unit 21ba informs the ECU for executing vehicle motion control such as the brake ECU 22 of the tire wear state. The vehicle motion control is thus performed based on the reported tire wear state.

The brake ECU 22 constitutes a brake control device that performs various brake controls. By driving the actuator for controlling the brake fluid pressure, the brake fluid pressure is automatically generated; the wheel cylinder is pressurized to generate braking force. In addition, the brake ECU 22 independently controls the braking force of each vehicle wheel.

As described above, the brake ECU 22 is informed of the determination result of the tire wear state from the wear determination unit 21ba. Based on this, the brake ECU 22 performs brake control according to the tire wear state. Specifically, as vehicle motion control, brake control is executed on the assumption that the braking becomes less effective as the tire 3 is worn out. For example, in the case of brake control in automatic driving or the like, control is performed such that the time of applying the brake is advanced as the wear state of the tire 3 progresses. Further, as the tire 3 wears, it becomes easy to slip; therefore, if the braking force is high, the tire 3 may slip. Therefore, the control for generating earlier the braking force lower than that before the wear is executed.

The notification apparatus 23 is composed of, for example, a meter display or the like, and is used to notify the driver of a tire wear state that requires more careful driving. In case that the notification apparatus 23 is configured with the meter display, it is located at a position allowing the driver to easily recognize during driving of the vehicle, for example, within an instrument panel in the vehicle. When the data indicating the tire wear state is transmitted from the reception apparatus 21, the meter display can visually notify the driver by displaying the data in a manner in which the contents can be grasped. The notification apparatus 23 can also be configured with a buzzer, a speech guidance device, or the like.

As described above, the tire system 100 according to the present embodiment is configured. The respective devices or the like forming the vehicle body side system 2 are connected to each other through an in-vehicle LAN (Local Area Network) like CAN (Controller Area Network) communication. Thus the respective devices or the like are capable of communicating information mutually through the in-vehicle LAN.

In the tire system 100 configured in this way, as described above, the signal processing method is changed depending on whether the road surface is wet or the road surface is other than that. Then, on a wet road surface, the peak level value of the vibration level at the stepping time of stepping on and the level value (here, the integrated value) of the vibration level in the post-kicking region are used as wear data, and the tire wear state is detected based on them. This makes it possible to detect a tire wear state on a wet road surface.

Further, the portion of the detection signal of the vibration sensor device 11 used for detecting the tire wear state is different between the wet road surface and the other road surface, and the tire wear state is detected by using the portion suitable for each. Therefore, it is possible to accurately detect the tire wear state on both the wet road surface and the other road surface (i.e., non-wet road surface).

In the present embodiment, the tire wear state can be detected on both the wet road surface and the other road surface (i.e., the non-wet road surface), but at least it may be performed on the wet road surface. In that case, for example, when the state detection unit 13b detects that the road surface state is a wet road surface, various functional units used for detecting the tire wear state on the wet road surface may be made to function.

Second Embodiment

A second embodiment will be described. The present embodiment enables the tire wear state to be detected more accurately than the first embodiment. Since the others are the same as those in the first embodiment, only the parts different from the first embodiment will be described.

Figure 12:
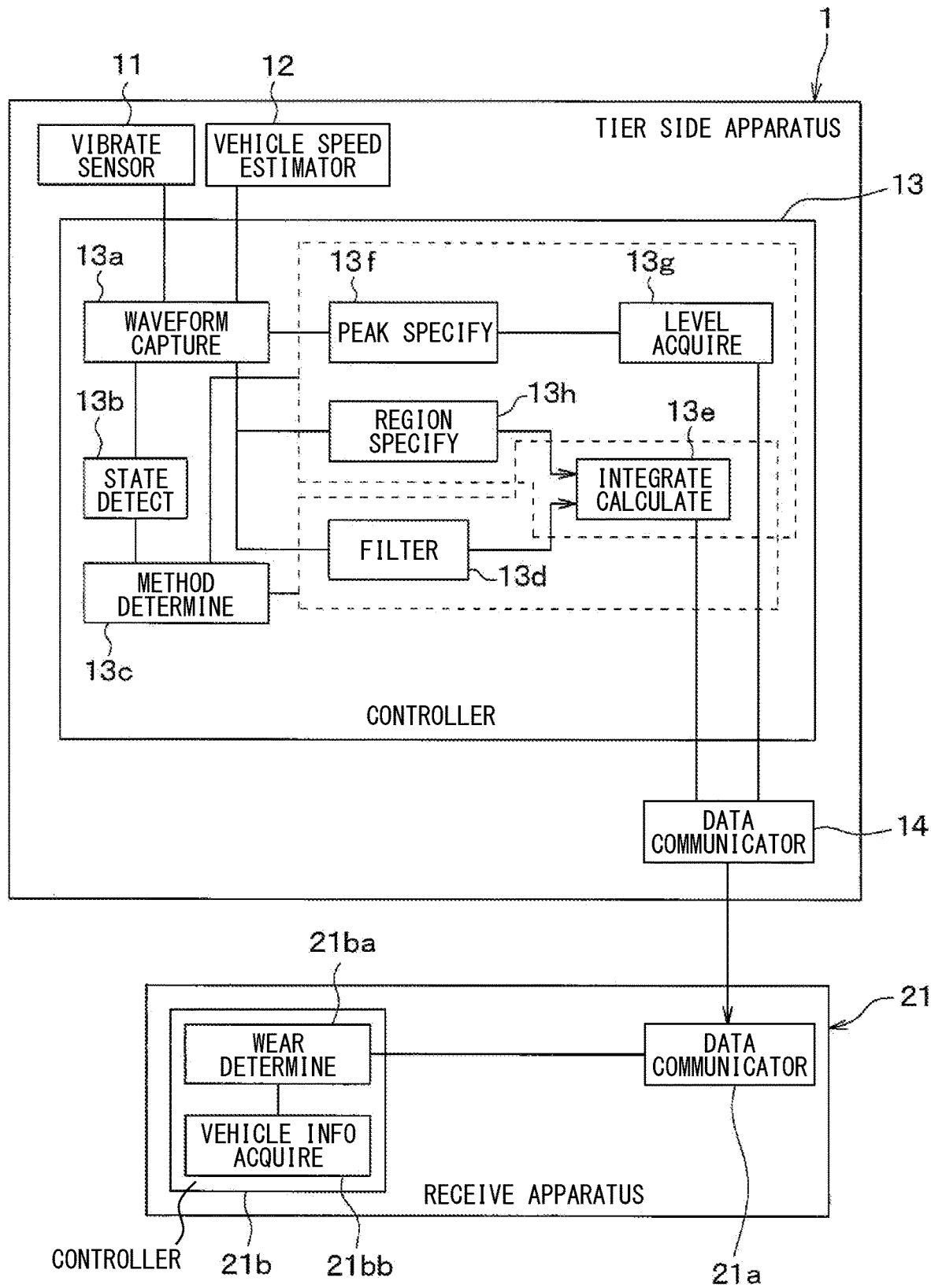
FIG. 12 is a diagram showing a block configuration of a tire wear detection apparatus according to a second embodiment.

As shown in FIG. 12, in the present embodiment, the controller unit 21b of the reception apparatus 21 is provided with a vehicle information acquisition unit 21bb. The vehicle information acquisition unit 21bb acquires information related to the traveling of the vehicle (hereinafter referred to as vehicle information). When detecting the tire wear state, it is preferable that the detection signal of the vibration sensor device 11 does not show any influence due to the running state or traveling state of the vehicle as much as possible.

Therefore, in the present embodiment, the vehicle information acquisition unit 21bb acquires the vehicle information. Data effective for detecting the tire wear state is selected from the received wear data so as to exclude the case where the running state affects the detection signal of the vibration sensor device 11. As a result, the tire wear state can be detected more accurately.

Here, examples of vehicle information include various information (i.e., various information items) such as vehicle speed information, acceleration/deceleration information, steering information, road surface information, tire pressure information, load information, weather information, position information, temperature information, and the like. At least one of these vehicle information or information items may be acquired by the vehicle information acquisition unit 21bb, but it is preferable that a plurality of such vehicle information (i.e., information items) can be acquired.

Since the vehicle speed information is handled by, for example, a meter ECU (Electronic Control Unit), it can be transmitted from the meter ECU to the vehicle information acquisition unit 21bb through an in-vehicle LAN or the like. Since the acceleration/deceleration information is handled by the engine ECU or the like, it can be transmitted from the meter ECU to the vehicle information acquisition unit 21bb through the in-vehicle LAN or the like, and can be acquired by time-differentiating the vehicle speed indicated by the vehicle speed information. Since the steering information is handled by the steering ECU or the like, it can be transmitted from the steering ECU to the vehicle information acquisition unit 21bb through the in-vehicle LAN or the like.

Road surface information can be obtained, for example, by performing image processing on the road surface image obtained by an in-vehicle camera. Further, by utilizing the fact that the detection signal of the vibration sensor device 11 also represents the road surface state, the road surface information can be detected based on the road surface data obtained from the detection signal transmitted to the tire side apparatus 1. As for the road surface state detection method, a well-known method, for example, the feature amount of tire vibration is acquired from the road surface data. A method of estimating the road surface state from the similarity between the feature amount and the teacher data such as a support vector can be applied.

The tire pressure information can be obtained from, for example, the ECU of the tire pressure monitoring system (hereinafter referred to as TPMS-ECU). For example, the tire side apparatus 1 may be provided with a tire pressure measuring function and may be configured to transmit the tire pressure to the TPMS-ECU so that the tire pressure obtained by the TPMS-ECU is transmitted to the vehicle information acquisition unit 21bb. Regarding the load information, the contact length of the tire 3 is shown between the first peak value and the second peak value of the vibration waveform of the detection signal of the vibration sensor device 11 shown in FIG. 4. Therefore, the load information can be calculated from the tire pressure and the contact length. Further, when the suspension ECU or the like handles the load information, the load information can be transmitted to the vehicle information acquisition unit 21bb from there.

The weather information, location information, and temperature information can be acquired through, for example, a navigation ECU.

For example, the vehicle speed information can be used to detect the tire wear state in a preferable vehicle speed range. The vibration level of the detection signal of the vibration sensor device 11 is small when the vehicle speed is low and large when the vehicle speed is high. Therefore, it is preferable that the tire wear state is detected when the vehicle speed is not too small and not too large. Therefore, based on the vehicle speed information, the tire wear state is detected when the vehicle speed is in a predetermined speed range, for example, 40 km/h±α.

The acceleration/deceleration information is used to detect that it is not during sudden acceleration or sudden braking. At the time of sudden acceleration or sudden braking, the influence may appear on the detection signal of the vibration sensor device 11. Therefore, for example, the tire wear state is detected when the acceleration/deceleration is equal to or less than a predetermined value.

The steering information is used, for example, to detect that the vehicle is traveling straight. The influence may appear in the detection signal of the vibration sensor device 11 when the vehicle is turning. Therefore, for example, the tire wear state is detected when the steering angle is equal to or less than a predetermined value, preferably when traveling straight ahead.

The road surface information is used to detect that the road surface is flat. For example, there is a case where the tire 3 may slip when traveling on an icy road, or there is a case where the vibration may occur due to the unevenness on an uneven road surface such as a gravel road. Such a case may affect the detection signal of the vibration sensor device 11. Therefore, when detecting the tire wear state on a wet road surface, the tire wear state is detected on a flat road such as an asphalt road surface. Further, when the tire wear state is detected on a road surface other than the wet road surface, the tire wear state is detected, for example, on an asphalt road surface when traveling on a dry road surface.

The tire pressure information is used to detect that the tire pressure is within a proper air pressure range. If the tire air pressure is too high, the tire 3 is likely to vibrate due to the influence of the unevenness of the road surface, and if the tire air pressure is low, the tire 3 is less likely to vibrate. Therefore, the influence of the tire pressure may appear on the detection signal of the vibration sensor device 11. Therefore, the tire wear state is detected when the tire pressure is within a predetermined proper air pressure range.

The load information is used to detect that the load is not overloaded, specifically, that it is not in an overcharging state. At the time of overloading, the vibration characteristics of the tire 3 may change as compared with the normal time. Therefore, the tire wear state is detected when the load is within a predetermined proper load range.

The weather information is used to detect that the environment is not suitable for detecting the tire wear state, such as heavy rain, snowfall, or freezing. In the event of heavy rain, snowfall, freezing, etc., the tire 3 may slip, which may affect the detection signal of the vibration sensor device 11. Therefore, when detecting the tire wear state on a wet road surface, the tire wear state is detected, for example, when it is raining and the amount of precipitation is within a predetermined range. Further, when detecting a tire wear state on a road surface other than a wet road surface, for example, the tire wear state is detected on a dry road where the influence of slip is less likely to occur in fine weather.

The location information is used to detect that the vehicle is driving in a place that is not suitable for detecting tire wear state, such as slopes and road surfaces under construction, or detect that the vehicle is running in a place suitable for detecting tire wear, such as a highway. It is preferable that the tire wear state is detected when stable running is performed at a constant speed. Therefore, tire wear state should be detected while driving on flat paved roads that are not slopes or not under construction, preferably highways.

The location information can also be used in combination with the weather information. That is, the weather information is provided for each region. Therefore, the driving location of the vehicle is specified from the location information, and the weather in the traveling location is acquired from the weather information. By doing so, it is possible to detect the tire wear state based on more accurate weather information.

The temperature information is used to detect that the temperature is not suitable for detecting the tire wear state. The tire 3, which is a rubber product, becomes soft at high temperatures, and its spring characteristics change. This may result in a situation unsuitable for detecting a tire wear state. Therefore, if the outside air temperature is equal to or higher than a predetermined temperature, the tire wear state is not detected.

In this way, the vehicle information acquisition unit 21*bb* can acquire the vehicle information, and based on the vehicle information, the tire wear state can be detected under more suitable conditions. That is, when wear data is sent from the tire side apparatus 1, data effective for detecting the tire wear state can be selected from the sent wear data based on the vehicle state acquired by the vehicle information acquisition unit 21*bb*. For example, it is possible to select data that is considered to be particularly effective for detecting a tire wear state, such as wear data when a vehicle is traveling straight at a constant speed within a predetermined speed range. This makes it possible to detect the tire wear state with higher accuracy.

Suppose a case where in order to accurately detect tire wear, for example, tire wear is detected when the vehicle speed is within a predetermined speed range. In this case, the wear data may be transmitted only when the condition is satisfied by the tire side apparatus 1. For example, in the tire side apparatus 1, the vehicle speed estimator device 12 can calculate the vehicle speed. Therefore, the detection signal of the vibration sensor device 11 is captured by the waveform capture unit 13*a* only when the calculated vehicle speed is within a predetermined speed range. In this way, the wear data can be transmitted when it is suitable for detecting the tire wear state, and the tire wear state can be detected more accurately. In addition to this, it is possible to reduce the transmission frequency and reduce the power consumption.

Third Embodiment

A third embodiment will be described. In this embodiment, the tire wear state can be initially set for the first and second embodiments. Since the other parts are the same as those of the first and second embodiments, only the parts different from the first and second embodiments will be described. Although the case where the configuration of the present embodiment is applied to the first embodiment will be described here as an example, it can also be applied to the second embodiment.

As shown in FIG. 13, in the present embodiment, the controller unit 21*b* is provided with an initial value setting unit 21*bc*. The initial value setting unit 21*bc* sets the initial value of the tire wear state.

As described in the first embodiment, even if the type of the tire 3 is changed, the relationship between the groove depth of the tire 3 and the integrated value is as shown in FIG. 10. However, since the integrated value is deviated, it may be difficult to set a threshold value or a warning threshold value that can handle various types. Considering this, an initial value may be designated as a value corresponding to the tire wear state of the tire 3 before wear, that is, a value corresponding to the tire wear state when the tire 3 is new. The standardization of the level value of the vibration level, here the integral value, may be preferably performed based on such an initial value.

Specifically, the integrated value when the tire 3 is new is set to 1. The standardized integrated value is set so that the larger the change is, the larger the value is, in proportion to the change in the integrated value for each groove depth. As a result of such standardization, the standardized integrated value for each groove depth of the tire 3 becomes almost the same regardless of the type of the tire 3.

Therefore, the initial value setting unit 21*bc* sets the integrated value obtained when the tire 3 is new as the initial value. The wear determination unit 21*ba* obtains the integrated value obtained at the time of detecting the tire wear state as a standardized integrated value expressed as a relative change with respect to the initial value. By doing so, by comparing the standardized integrated value with the threshold value or the warning threshold value, it is possible to detect the tire wear state more accurately regardless of the type of the tire 3.

The standardized integrated value for the groove depth of the tire 3 can be obtained in the same manner for the wet road surface and other road surface. The same result was obtained when the standardized integrated value was calculated in the road surface state other than the wet road surface by the experiment. Therefore, by standardizing various road surface states based on the initial values, it is possible to detect the tire wear state more accurately regardless of the type of the tire 3.

Fourth Embodiment

A fourth embodiment will be described. In the present embodiment, the road surface state is detected by the vehicle body side system 2, unlike the first to third embodiments. Since the other parts are the same as those of the first to third embodiments, only the parts different from the first to third embodiments will be described. Here, the case where the configuration of the present embodiment is applied to the first embodiment will be described as an example, but it can also be applied to the second and third embodiments.

Figure 14:
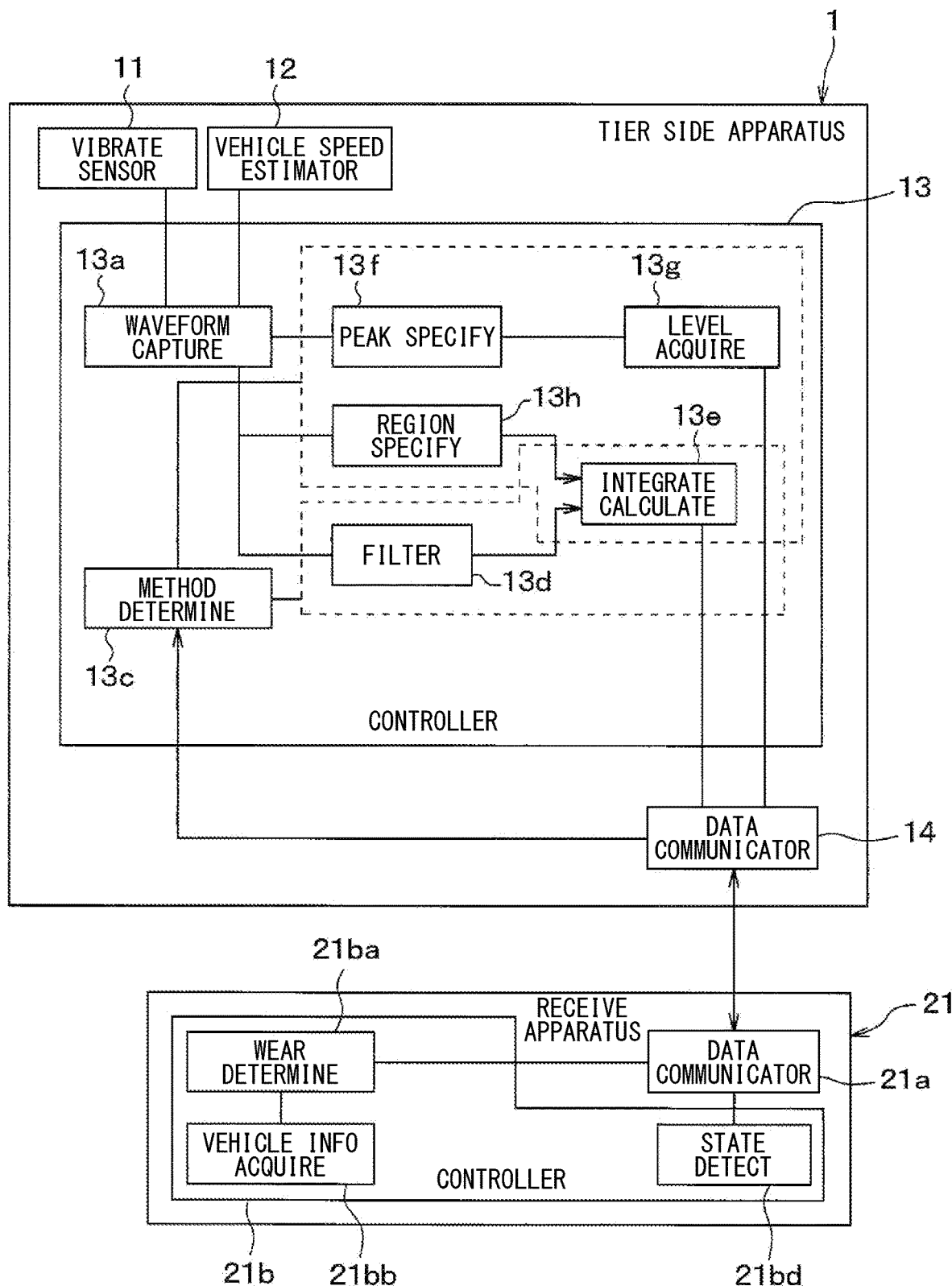
FIG. 14 is a diagram showing a block configuration of a tire wear detection apparatus according to a fourth embodiment.

As shown in FIG. 14, in this embodiment, a state detection unit 21bd is included in the controller unit 21b in the reception apparatus 21. The state detection unit 13b provided in the controller unit 13 in the tire side apparatus 1 in the first embodiment is eliminated.

In the second embodiment, a case where the vehicle information acquisition unit 21bb acquires the road surface state as vehicle information has been described. Here, this vehicle information can also be used for detecting the road surface state in the state detection unit 21bd. Then, bidirectional communication can be performed between the tire side apparatus 1 and the vehicle body side system 2. Data related to the road surface state detected by the state detection unit 21bd is transmitted as road surface data from the data communicator device 21a to the tire side apparatus 1.

In this way, the tire side apparatus 1 receives the road surface data through the data communicator device 14 and transmits the road surface data to the method determination unit 13c. The signal processing method may be determined by the method determination unit 13c based on the road surface data.

In this way, the road surface state may be acquired by the vehicle body side system 2 and the road surface data representing the road surface state may be transmitted to the tire side apparatus 1.

When bidirectional communication is performed between the tire side apparatus 1 and the reception apparatus 21, various forms of bidirectional communication can be applied. Various forms of bidirectional communication can be applied, such as Bluetooth communication including BLE (Bluetooth Low Energy) communication, wireless LAN (Local Area Network) such as wifi, Sub-GHz communication, ultra wideband communication, ZigBee, etc. can be applied. "Bluetooth" is a registered trademark.

Other Embodiments

Although the present disclosure is made with reference to the embodiments described above, the present disclosure is not limited to such embodiments but may include various changes and modifications which are within equivalent ranges. In addition, various combinations and forms, and further, other combinations and forms including only one element, or more or less than these elements are also within the scope and the scope of the present disclosure.

(1) For example, in each of the above embodiments, the vibration sensor device 11 outputs a detection signal according to the magnitude of vibration in the tangential direction of the tire 3. This is because the change in vibration appears most on the wet road surface according to the wear state of the tire 3. In contrast, the vibration also changes in the radial direction and the width direction of the tire 3 according to the wear state of the tire 3. Therefore, the vibration sensor device 11 may output a detection signal according to the magnitude of vibration in the radial direction or the width direction of the tire 3, and tire wear detection may be performed based on such a detection signal.

(2) Further, in each of the above embodiments, it has been described that the wear state of the tire 3 is detected every one to several hundred kilometers of travel by the vehicle. This is also only an example, and the wear state of the tire 3 may be detected every shorter distance or every longer distance. Then, when detecting the wear state of the tire 3, the wear data may be transmitted a plurality of times instead of being transmitted only once from the tire side apparatus 1.

In particular, in the second embodiment, when the wear data sent from the tire side apparatus 1 is not selected as valid data, the wear state of the tire 3 is not detected based on the wear data. Therefore, it is preferable that the wear data is transmitted from the tire side apparatus 1 a plurality of times, and the wear state of the tire 3 is detected based on any of the wear data. Further, even when the data is transmitted a plurality of times, if the running state of the vehicle has not changed, the wear data may again not be selected as valid data. Therefore, it is preferable that the wear data transmission interval is set to every several hundred meters to several kilometers, assuming that the traveling states are different.

(3) Further, each of the above embodiments has described a case where the detection result of the wear state of the tire 3 is used for vehicle motion control by reporting it from the notification apparatus 23 or by transmitting the detection result to the brake ECU 22. However, this is also just an example. For example, the vehicle body side system 2 may include a vehicle communication apparatus capable of communicating with a communication medium outside the vehicle. Through this vehicle communication apparatus, it is possible to notify a communication center or a mobile device such as a mobile phone. By notifying the mobile device, it is possible to recommend the user to replace the tire 3 through the mobile device. By notifying the communication center, it is possible to notify the vehicle maintenance shop such as a dealer through the communication center of the wear state of the tire 3. As a result, the vehicle maintenance shop can notify the user of the tire 3 replacement guidance and the like.

(4) Further, each of the above embodiments has described a case where the vehicle speed estimator device 12 estimates the vehicle speed based on the detection signal of the vibration sensor device 11. However, this is also just an example. Two-way communication is enabled by the tire side apparatus 1 and the reception apparatus 21. By acquiring data on the vehicle speed from the reception apparatus 21 through the data communicator device 14, the vehicle speed estimator device 12 may estimate the vehicle speed.

Further, suppose a case where bidirectional communication can be performed between the tire side apparatus 1 and the reception apparatus 21. In this case, selecting the wear data as in the second embodiment can be used as selecting the time to prepare the wear data. That is, based on the vehicle information acquired by the vehicle information acquisition unit 21*bb*, the reception apparatus 21 determines that the running state is effective for detecting the wear state of the tire 3. At this time, a wear data request signal is output to the tire side apparatus 1. Then, the tire side apparatus 1 transmits the wear data in response to receiving the request signal. In this way, the wear data is delivered to the reception apparatus 21 when the running state is effective for detecting the wear state of the tire 3. Therefore, it is possible to accurately detect the wear state of the tire 3 based on the wear data.

(5) Further, in the above embodiments, the tire wear state is detected using both the peak level value of the vibration level at the stepping time and the integrated value of the level value of the vibration level in the post-kicking region. In this case, both the values are compared with the respective threshold values. On the other hand, for example, the value obtained by dividing the level value of the vibration level in the post-kicking region by the peak level value of the vibration level at the stepping time may be compared with a threshold value. On a wet road surface, as tire wear progresses, the peak level value of the vibration level at the stepping time decreases, and the level value of the vibration level in the post-kicking region increases. Therefore, the value obtained by dividing the level value of the vibration level in the post-kicking region by the peak level value of the vibration level at the stepping time increases the denominator and decreases the numerator as tire wear progresses. As a result, the change with respect to tire wear becomes larger. Therefore, it is possible to more accurately detect the tire wear state.

(6) In each of the embodiments described above, the tire side apparatus 1 is provided in each of the plurality of tires 3. However, it is sufficient that the tire side apparatus 1 is provided in at least one of the plurality of tires 3. That is, the tire wear state is substantially the same for a plurality of tires 3. Therefore, if at least one tire side apparatus 1 is provided, and if the tire wear state is detected based on the wear data created there, it can be estimated that the other tires 3 are also in the same wear state.

(7) In the above embodiments, the controller unit 13 and the controller unit 21*b*, each of which may also be referred to a controller, are described to each include a microcomputer equipped with a CPU, ROM, RAM, I/O, etc., as an example. However, there is no need to be limited thereto. That is, such controllers and methods described in the present disclosure may be implemented by one or more special-purpose computers. Such computers may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more hardware logic circuits.

The computer programs may be stored, as instructions being executed by a computer, in a tangible non-transitory computer-readable storage medium.

For reference to further explain features of the present disclosure, the description is added as follows.

There is a tire wear detection apparatus for detecting a tire wear state. In this tire wear detection apparatus, the time-series waveform of acceleration is used to extract (i) the acceleration waveform of the stepping-in region, including the peak at the time of stepping, occurring when the rubber block of the tire steps on the road surface, and (ii) the acceleration waveform of the kicking region, including the peak at the time of kicking out (i.e., the kicking time), occurring when the rubber block of the tire moves away to separate from the road surface. Then, the tire wear state is detected from the difference in frequency characteristics obtained by frequency-resolving the respective extracted acceleration waveforms.

However, the acceleration waveform changes greatly depending on the road surface state. Therefore, the tire wear state detection method described above can detect the tire wear state only while traveling on a dry road surface. Therefore, it is desired to be able to detect the tire wear state even on a wet road surface. In general, it is unlikely that the surface will remain wet over a long distance. However, it is desirable to be able to detect tire wear state on wet roads during the season having the period of continuous rain.

It is thus desired to provide a tire wear detection apparatus capable of detecting a tire wear state at least on a wet road surface.

An aspect of the present disclosure described herein is set forth in the following clauses.

According to an aspect of the present disclosure, a tire wear detection apparatus is provided to include a tire side apparatus and a vehicle body side system. The tire side apparatus includes (i) a vibration detector device arranged on a tire in a vehicle, the vibration detector device being configured to output a detection signal according to a magnitude of a vibration of the tire, (ii) a vehicle speed estimator device configured to estimate a vehicle speed of the vehicle, (iii) a signal processor configured to generate a wear data indicating a wear state of the tire appearing in a waveform of the detection signal, and (iv) a first data communicator device configured to transmit the wear data. The vehicle body side system includes (i) a second data communicator device provided in a vehicle body of the vehicle, the second data communicator device being configured to receive the wear data, and (ii) a controller including a wear determination unit configured to determine the wear state of the tire based on the wear data.

Herein, an apparatus corresponding position in the tire is defined as a position in the tire corresponding to an arranged position at which the tire side apparatus is arranged. The signal processor in the tire side apparatus further includes (i) a state detection unit configured to detect whether a state of a road surface is a wet road surface or a non-wet road surface that is other than the wet road surface, and (ii) a level acquisition unit, or a level calculation unit, or both the level acquisition unit and the level calculation unit. The level acquisition unit is configured to acquire a peak level value which is a peak of a level value of a vibration level at a stepping time at which the apparatus corresponding position starts to contact the road surface, from a vibration waveform of the tire indicated by the detection signal, in response to the wet road surface being detected. The level calculation unit is configured to calculate a level value of the vibration level in a post-kicking range after the apparatus corresponding position kicks to separate from the road surface, from the vibration waveform of the tire indicated by the detection signal, in response to the wet road surface being detected. The signal processor is configured to generate, as the wear data, a data indicating at least one value that is the peak level value at the stepping time, or the level value in the post-kicking region, or both the peak level value at the stepping time and the level value in the post-kicking region.

In this way, the state detection unit detects whether the road surface is under the wet road surface or other than that. In cases that the wet road surface is detected, the wear data is obtained as at least one value that is (i) the peak level value of the vibration level at the time of stepping on the road surface, or (ii) the level value (e.g., the integrated value) of the vibration level in the post-kicking region, or (iii) both of them (i) and (ii). Then, the tire wear state is detected based on the wear data. This makes it possible to detect a tire wear state on a wet road surface.

What is claimed is:

1. A tire wear detection apparatus comprising:
   a tire side apparatus including
   (i) a vibration detector device arranged to a tire in a vehicle, the vibration detector device being configured to output a detection signal according to a magnitude of a vibration of the tire,
   (ii) a vehicle speed estimator device configured to estimate a vehicle speed of the vehicle,
   (iii) a signal processor configured to generate a wear data indicating a wear state of the tire appearing in a vibration waveform indicated by the detection signal, and
   (iv) a first data communicator device configured to transmit the wear data; and
   a vehicle body side system including
   (i) a second data communicator device provided in a vehicle body of the vehicle, the second data communicator device being configured to receive the wear data, and
   (ii) a controller including a wear determination unit configured to determine the wear state of the tire based on the wear data,
   wherein an apparatus corresponding position in the tire is defined as a position in the tire corresponding to an arranged position at which the tire side apparatus is arranged,
   wherein the signal processor in the tire side apparatus further includes
   (i) a state detection unit configured to detect whether a state of a road surface is a wet road surface or a non-wet road surface that is other than the wet road surface, and
   (ii) a level acquisition unit, or a level calculation unit, or both the level acquisition unit and the level calculation unit,
   wherein the level acquisition unit is configured to acquire a peak level value which is a peak of a level value of a vibration level at a stepping time that is a time at which the apparatus corresponding position starts to contact the road surface, from the vibration waveform of the tire indicated by the detection signal, in response to the wet road surface being detected,
   wherein the level calculation unit is configured to calculate the level value of the vibration level in a post-kicking range that is a range after the apparatus corresponding position kicks to separate from the road surface, from the vibration waveform of the tire indicated by the detection signal, in response to the wet road surface being detected,
   wherein the signal processor is configured to generate, as the wear data, a data indicating at least one value that is (i) the peak level value at the stepping time, or (ii) the level value in the post-kicking region, or (iii) both the peak level value at the stepping time and the level value in the post-kicking region.

2. The tire wear detection apparatus according to claim 1, wherein:
   the vibration detector device is configured to output, as the detection signal, a signal corresponding to the vibration in any one direction of three directions of the tire being a radial direction, a circumferential direction, and a width direction.

3. The tire wear detection apparatus according to claim 1, wherein:
   the signal processor includes a peak specification unit configured to specify a time point of the peak of the vibration level at the stepping time; and
   the level acquisition unit is configured to acquire, as the peak level value, the level value of the vibration level at the specified time point of the peak.

4. The tire wear detection apparatus according to claim 3, wherein:
   the peak specification unit is configured to,
   define, as a reference time point, a time point at which the vibration level becomes a minimum value when the apparatus corresponding position kicks to separate from the road surface, and
   define, as the time point of the peak of the vibration level, a time point at which the vibration level becomes a maximum value during a duration, the duration starting with a time point tracing back a predetermined period of time from the reference time point, the duration ending with the reference time point.

5. The tire wear detection apparatus according to claim 1, wherein:
   the controller includes a vehicle information acquisition unit configured to acquire vehicle information related to a traveling state of the vehicle; and
   the wear determination unit in the controller is configured to determine the wear state of the tire based on the vehicle information and the wear data.

6. The tire wear detection apparatus according to claim 5, wherein:
   the vehicle information includes at least one information item of nine information items that are (i) a vehicle speed information item, (ii) an acceleration/deceleration information item, (iii) a steering information item, (iv) a road surface information item, (v) a tire pressure information item, (vi) a load information item, (vii) a weather information item, (viii) a position information item, and (ix) a temperature information item; and
   the wear determination unit is configured to select a valid wear data from the wear data based on the vehicle information, and determine the wear state of the tire based on the selected valid wear data.

7. The tire wear detection apparatus according to claim 1, wherein:
   the wear determination unit is configured to determine the wear state of the tire by comparing the at least one value with a corresponding threshold value, the at least one value being (i) the peak level value at the stepping time, or (ii) the level value in the post-kicking region, or (iii) both the peak level value at the stepping time and the level value in the post-kicking region.

8. The tire wear detection apparatus according to claim 1, wherein:

the controller includes an initial value setting unit configured to set a value corresponding to the level value of the vibration level of the tire before wear as an initial value; and the wear determination unit is configured to
standardize the level value indicated by the wear data based on the initial value, and
determine the wear state of the tire based on the standardized level value.

9. The tire wear detection apparatus according to claim 1, wherein:

the signal processor is configured to differ in a method of determining the wear state between the wet road surface and the non-wet road surface; and the level calculation unit is configured to generate, as the wear data, an integrated value of the level value of the vibration level in a specific frequency band from the vibration waveform of the tire indicated by the detection signal, in response to the non-wet road surface being detected.

10. A tire wear detection apparatus comprising:
a tire side apparatus including
(i) a sensor arranged to a tire in a vehicle, the sensor being configured to output a detection signal according to a magnitude of a vibration of the tire,
(ii) a first controller coupled with the sensor, the first controller being configured to generate a wear data indicating a wear state of the tire appearing in a vibration waveform indicated by the detection signal, and
(iii) a first data transceiver coupled with the first controller, the first data transceiver configured to transmit the wear data; and
a vehicle body side system including
(i) a second data transceiver provided in a vehicle body of the vehicle, the second data transceiver being configured to receive the wear data, and
(ii) a second controller coupled with the second data transceiver, the second controller being configured to determine the wear state of the tire based on the wear data,
wherein the tire side apparatus is arranged at an arranged position on a back surface side of a tread of the tire, and an apparatus corresponding position in the tread of the tire is defined as a position in the tread of the tire corresponding to the arranged position at which the tire side apparatus is arranged, wherein the first controller in the tire side apparatus is further configured to detect whether a state of a road surface is a wet road surface or a non-wet road surface that is other than the wet road surface, and obtain at least one value from the vibration waveform of the tire indicated by the detection signal, in response to the wet road surface being detected, the at least one value being
(i) a peak level value which is a peak of a level value of a vibration level at a contact start time at which the apparatus corresponding position starts to contact the road surface, or
(ii) the level value of the vibration level in a range following a contact end time at which the apparatus corresponding position ends contacting the road surface, or
(iii) both the peak level value of the vibration level at the contact start time and the level value of the vibration level in the range following the contact end time, wherein the first controller in the tire side apparatus is configured to generate a data indicating the at least one value, as the wear data indicating the wear state of the tire.

11. The tire wear detection apparatus according to claim 10, wherein:

the tire side apparatus further includes a calculator configured to calculate a vehicle speed of the vehicle based on the detection signal; and the first controller is further configured to
obtain a time required for the tire to make one rotation based on the vehicle speed calculated by the calculator, and
capture the detection signal output by the sensor for the time required for the tire to make one rotation.

12. The tire wear detection apparatus according to claim 10, wherein:

the level value of the vibration level in the range following the contact end time is provided as an integrated value of the vibration level in the region following the contact end time.

* * * * *